(12) United States Patent
Kline et al.

(10) Patent No.: US 12,192,360 B2
(45) Date of Patent: Jan. 7, 2025

(54) METHOD AND SYSTEM FOR FACILITATING IDENTITY AND ACCESS MANAGEMENT IN A CLOUD ENVIRONMENT

(71) Applicant: JPMorgan Chase Bank, N.A., New York, NY (US)

(72) Inventors: Kabron Austin Kline, Grove City, OH (US); Godfrey Paul, Ramsgate (GB); Ily Zislin, New York, NY (US); Ian Mark Miller, London (GB); Carl Dashfield, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 269 days.

(21) Appl. No.: 17/809,334

(22) Filed: Jun. 28, 2022

(65) Prior Publication Data

US 2023/0015246 A1    Jan. 19, 2023

Related U.S. Application Data

(60) Provisional application No. 63/203,206, filed on Jul. 13, 2021.

(51) Int. Cl.
*H04L 29/06* (2006.01)
*H04L 9/08* (2006.01)
*H04L 9/32* (2006.01)

(52) U.S. Cl.
CPC .......... *H04L 9/3213* (2013.01); *H04L 9/0866* (2013.01); *H04L 9/3247* (2013.01); *H04L 9/3271* (2013.01)

(58) Field of Classification Search
CPC ... H04L 9/3271; H04L 9/0866; H04L 9/3213; H04L 9/0891; H04L 9/3247
See application file for complete search history.

(56) References Cited

U.S. PATENT DOCUMENTS

| | | | | |
|---|---|---|---|---|
| 11,012,444 | B2* | 5/2021 | Bansal | G06F 21/41 |
| 2006/0048216 | A1* | 3/2006 | Hinton | H04L 63/0815 726/8 |
| 2014/0101679 | A1* | 4/2014 | Yin | H04N 21/6334 725/5 |
| 2021/0377045 | A1* | 12/2021 | Doney | H04L 9/3247 |

\* cited by examiner

*Primary Examiner* — Tri M Tran
(74) *Attorney, Agent, or Firm* — Greenblum & Bernstein, P.L.C.

(57) ABSTRACT

A method for facilitating identity and access management in a cloud environment based on a zero-trust configuration is provided. The method includes retrieving, via a job, a token from a corresponding identity provider, the job including a unit of work and a unit of execution that corresponds to a change; retrieving, via the job, a change authorization from a change management system, the change authorization including a signed change authorization; retrieving, via the job, a change artifact from an artifact repository, the change artifact including a signed change artifact; requesting, via the job, a change orchestrator to execute the change, the request including the token, the change authorization, and the change artifact; instructing, via the change orchestrator, a service broker to execute the change; and executing, via the service broker, the change within the cloud environment.

20 Claims, 16 Drawing Sheets

METHOD AND SYSTEM FOR FACILITATING IDENTITY AND ACCESS MANAGEMENT IN A CLOUD ENVIRONMENT

CROSS-REFERENCE TO RELATED APPLICATIONS

This application claims the benefit of U.S. Provisional Patent Application Ser. No. 63/203,206, filed Jul. 13, 2021, which is hereby incorporated by reference in its entirety.

BACKGROUND

1. Field of the Disclosure

This technology generally relates to methods and systems for identity and access management, and more particularly to methods and systems for facilitating identity and access management in a cloud environment based on a zero-trust configuration.

2. Background Information

Many business entities operate cloud environments through a high-level descriptive coding language by utilizing infrastructure as code to manage and provision networked infrastructure. To ensure proper access to enterprise resources in such a schema, an identity and access management (IAM) framework of policies and technologies are often used. Historically, the use of infrastructure as code together with IAM frameworks and controls have resulted in varying degrees of success with respect to change authorization in a continuous integration and continuous deployment (CI/CD) pipeline.

One drawback of using conventional infrastructure as code models is that in many instances, each component in the schema must rely on the integrity of a prior connected component. As a result, the reliance of a high level of trust between components culminates in an eventual concentration of risk in a small number of components with absolute authority. Additionally, the use of an IAM framework as a compensating control introduces additional burdens such as, for example, the prevention of horizontal movement between unrelated assets outside of normal paths and the attestation of fully approved code in fully approved configurations without the possibility of unauthorized change.

Therefore, there is a need for an infrastructure as code configuration and an IAM control pattern that establishes a zero-trust basis for evidencing the pre-approval of change at the initial change request from the CI/CD pipeline to the most deeply nested service broker action.

SUMMARY

The present disclosure, through one or more of its various aspects, embodiments, and/or specific features or sub-components, provides, inter alia, various systems, servers, devices, methods, media, programs, and platforms for facilitating identity and access management in a cloud environment based on a zero-trust configuration.

According to an aspect of the present disclosure, a method for facilitating identity and access management in a cloud environment based on a zero-trust configuration is provided. The method is implemented by at least one processor. The method may include retrieving, via a job, at least one token from a corresponding identity provider, the job may include at least one from among a unit of work and a unit of execution that corresponds to at least one change; retrieving, via the job, a change authorization from a change management system, the change authorization may include a signed change authorization; retrieving, via the job, a change artifact from an artifact repository, the change artifact may include a signed change artifact; requesting, via the job, a change orchestrator to execute the at least one change, the request may include at least one from among the at least one token, the change authorization, and the change artifact; instructing, via the change orchestrator, a service broker to execute the at least one change; and executing, via the service broker, the at least one change within the cloud environment.

In accordance with an exemplary embodiment, the at least one token may include a federated identity assertion token that is exchangeable for a resource specific access token.

In accordance with an exemplary embodiment, the job may further include at least one from among a continuous integration job and a continuous deployment job that modify at least one from among the cloud environment and an application within the cloud environment.

In accordance with an exemplary embodiment, the retrieving of the at least one token may further include requesting, via the job, the at least one token from the corresponding identity provider, the request for the at least one token may include a bootstrap identity and a uniform resource identifier; verifying, via the identity provider, the bootstrap identity; retrieving, via the identity provider, at least one identity attribute from an identity provider directory service; requesting, via the identity provider, an issuance authorization from an identity provider policy system, the request for the issuance authorization may include the at least one identity attribute and the uniform resource identifier; receiving, via the identity provider, a response from the identity provider policy system; and receiving, via the job, the at least one token from the identity provider based on the response.

In accordance with an exemplary embodiment, the retrieving of the change authorization may further include requesting, via the job, the change authorization from the change management system, the request for the change authorization may include the at least one token and a change authorization identifier; retrieving, via the change management system, a key from a change management identity provider; validating, via the change management system, the at least one token based on the key; authorizing, via the change management system, the request for the change authorization based on a result of the validating; retrieving, via the change management system, at least one change authorization attribute based on a result of the authorizing; signing, via the change management system, payload content corresponding to the job; and receiving, via the job, the change authorization from the change management system.

In accordance with an exemplary embodiment, the retrieving of the change artifact may further include requesting, via the job, the change artifact from the artifact repository, the request for the change artifact may include the at least one token and a change plan artifact path; retrieving, via the artifact repository, a key from a change management identity provider; validating, via the artifact repository, the at least one token based on the key; authorizing, via the artifact repository, the request for a change plan based on a result of the validating; and receiving, via the job, the change artifact from the artifact repository.

In accordance with an exemplary embodiment, the service broker may generate a service instance for a consumer of a service based on at least one unique characteristic of the service instance, the at least one unique characteristic may include a reference to a change plan and a parameter of the change plan.

In accordance with an exemplary embodiment, a control model may be used to create end-to-end evidence of a change pre-approval, the control model may include at least one from among a process control requirement, a change plan control requirement, a subscription control requirement, an environment control requirement, a change authorization requirement, a change plan requirement, and a change plan step requirement.

In accordance with an exemplary embodiment, the control model may perform native change detection by comparing at least one logged change with a state of a corresponding account, a corresponding entitlement, and a corresponding collected policy.

According to an aspect of the present disclosure, a computing device configured to implement an execution of a method for facilitating identity and access management in a cloud environment based on a zero-trust configuration is disclosed. The computing device including a processor; a memory; and a communication interface coupled to each of the processor and the memory, wherein the processor may be configured to retrieve, via a job, at least one token from a corresponding identity provider, the job may include at least one from among a unit of work and a unit of execution that corresponds to at least one change; retrieve, via the job, a change authorization from a change management system, the change authorization may include a signed change authorization; retrieve, via the job, a change artifact from an artifact repository, the change artifact may include a signed change artifact; request, via the job, a change orchestrator to execute the at least one change, the request may include at least one from among the at least one token, the change authorization, and the change artifact; instruct, via the change orchestrator, a service broker to execute the at least one change; and execute, via the service broker, the at least one change within the cloud environment.

In accordance with an exemplary embodiment, the at least one token may include a federated identity assertion token that is exchangeable for a resource specific access token.

In accordance with an exemplary embodiment, the job may further include at least one from among a continuous integration job and a continuous deployment job that modify at least one from among the cloud environment and an application within the cloud environment.

In accordance with an exemplary embodiment, to retrieve the at least one token, the processor may be further configured to request, via the job, the at least one token from the corresponding identity provider, the request for the at least one token may include a bootstrap identity and a uniform resource identifier; verify, via the identity provider, the bootstrap identity; retrieve, via the identity provider, at least one identity attribute from an identity provider directory service; request, via the identity provider, an issuance authorization from an identity provider policy system, the request for the issuance authorization may include the at least one identity attribute and the uniform resource identifier; receive, via the identity provider, a response from the identity provider policy system; and receive, via the job, the at least one token from the identity provider based on the response.

In accordance with an exemplary embodiment, to retrieve the change authorization, the processor may be further configured to request, via the job, the change authorization from the change management system, the request for the change authorization may include the at least one token and a change authorization identifier; retrieve, via the change management system, a key from a change management identity provider; validate, via the change management system, the at least one token based on the key; authorize, via the change management system, the request for the change authorization based on a result of the validating; retrieve, via the change management system, at least one change authorization attribute based on a result of the authorizing; sign, via the change management system, payload content corresponding to the job; and receive, via the job, the change authorization from the change management system.

In accordance with an exemplary embodiment, to retrieve the change artifact, the processor may be further configured to request, via the job, the change artifact from the artifact repository, the request for the change artifact may include the at least one token and a change plan artifact path; retrieve, via the artifact repository, a key from a change management identity provider; validate, via the artifact repository, the at least one token based on the key; authorize, via the artifact repository, the request for a change plan based on a result of the validating; and receive, via the job, the change artifact from the artifact repository.

In accordance with an exemplary embodiment, the processor may be further configured to generate, via the service broker, a service instance for a consumer of a service based on at least one unique characteristic of the service instance, the at least one unique characteristic may include a reference to a change plan and a parameter of the change plan.

In accordance with an exemplary embodiment, the processor may be further configured to use a control model to create end-to-end evidence of a change pre-approval, the control model may include at least one from among a process control requirement, a change plan control requirement, a subscription control requirement, an environment control requirement, a change authorization requirement, a change plan requirement, and a change plan step requirement.

In accordance with an exemplary embodiment, the processor may be further configured to perform, via the control model, native change detection by comparing at least one logged change with a state of a corresponding account, a corresponding entitlement, and a corresponding collected policy.

According to an aspect of the present disclosure, a non-transitory computer readable storage medium storing instructions for facilitating identity and access management in a cloud environment based on a zero-trust configuration is disclosed. The storage medium including executable code which, when executed by a processor, may cause the processor to retrieve, via a job, at least one token from a corresponding identity provider, the job may include at least one from among a unit of work and a unit of execution that corresponds to at least one change; retrieve, via the job, a change authorization from a change management system, the change authorization may include a signed change authorization; retrieve, via the job, a change artifact from an artifact repository, the change artifact may include a signed change artifact; request, via the job, a change orchestrator to execute the at least one change, the request may include at least one from among the at least one token, the change authorization, and the change artifact; instruct, via the change orchestrator, a service broker to execute the at least one change; and execute, via the service broker, the at least one change within the cloud environment.

In accordance with an exemplary embodiment, the at least one token may include a federated identity assertion token that is exchangeable for a resource specific access token, and wherein the job may further include at least one from among a continuous integration job and a continuous deployment job that modify at least one from among the cloud environment and an application within the cloud environment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
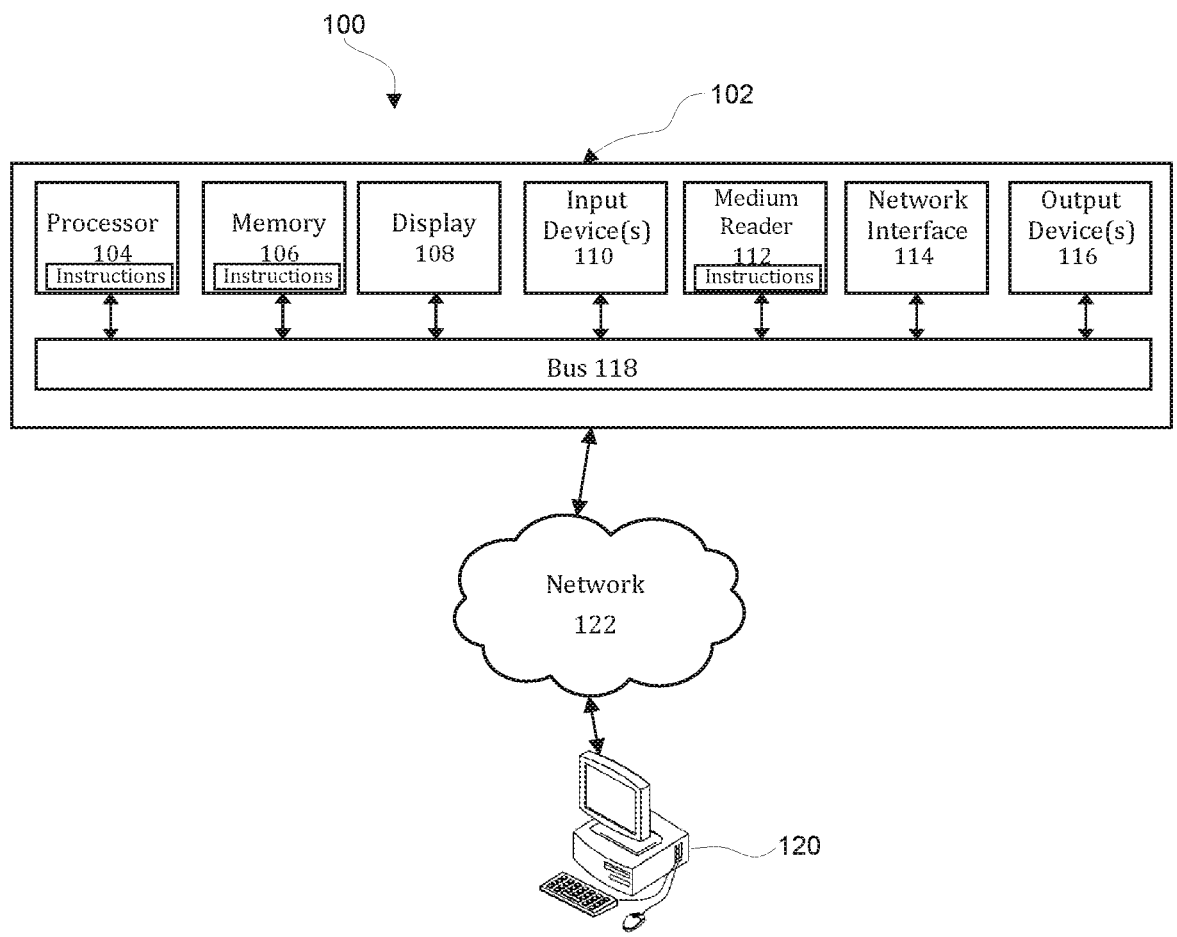
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating identity and access management in a cloud environment based on a zero-trust configuration.

Figure 2:
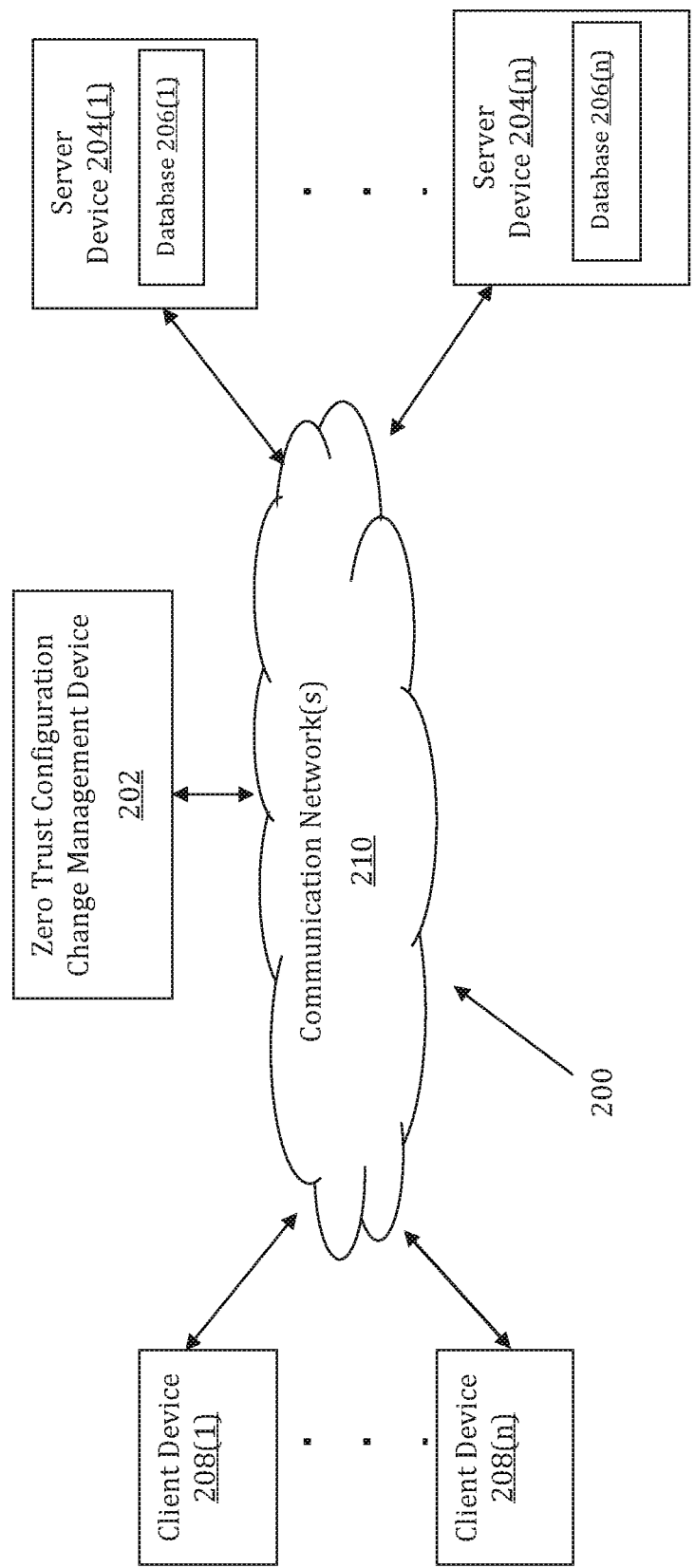
FIG. 2 illustrates an exemplary diagram of a network environment.

Referring to FIG. 2, a schematic of an exemplary network environment 200 for implementing a method for facilitating identity and access management in a cloud environment based on a zero-trust configuration is illustrated. In an exemplary embodiment, the method is executable on any networked computer platform, such as, for example, a personal computer (PC).

The method for facilitating identity and access management in a cloud environment based on a zero-trust configuration may be implemented by a Zero Trust Configuration Change Management (ZTCCM) device 202. The ZTCCM device 202 may be the same or similar to the computer system 102 as described with respect to FIG. 1. The ZTCCM device 202 may store one or more applications that can include executable instructions that, when executed by the ZTCCM device 202, cause the ZTCCM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ZTCCM device 202 itself, may be located in virtual server(s) running in a cloud-based computing environment rather than being tied to one or more specific physical network computing devices. Also, the application(s) may be running in one or more virtual machines (VMs) executing on the ZTCCM device 202. Additionally, in one or more embodiments of this technology, virtual machine(s) running on the ZTCCM device 202 may be managed or supervised by a hypervisor.

In the network environment 200 of FIG. 2, the ZTCCM device 202 is coupled to a plurality of server devices 204(1)-204(n) that hosts a plurality of databases 206(1)-206(n), and also to a plurality of client devices 208(1)-208(n) via communication network(s) 210. A communication interface of the ZTCCM device 202, such as the network interface 114 of the computer system 102 of FIG. 1, operatively couples and communicates between the ZTCCM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ZTCCM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ZTCCM devices that efficiently implement a method for facilitating identity and access management in a cloud environment based on a zero-trust configuration.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ZTCCM device 202 may be a standalone device or integrated with one or more other devices or apparatuses, such as one or more of the server devices 204(1)-204( n), for example. In one particular example, the ZTCCM device 202 may include or be hosted by one of the server devices 204(1)-204(n), and other arrangements are also possible. Moreover, one or more of the devices of the ZTCCM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ZTCCM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to CI/CD jobs, change actions, tokens, change authorizations, change artifacts, and enterprise policies.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ZTCCM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ZTCCM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ZTCCM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ZTCCM device 202, the server devices 204(1)-204(n), or the client devices 208(1)-208(n), for example, may be configured to operate as virtual instances on the same physical machine. In other words, one or more of the ZTCCM device 202, the server devices 204(1)-204(n), or the client devices 208(1)-208(n) may operate on the same physical device rather than as separate devices communicating through communication network(s) 210. Additionally, there may be more or fewer ZTCCM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
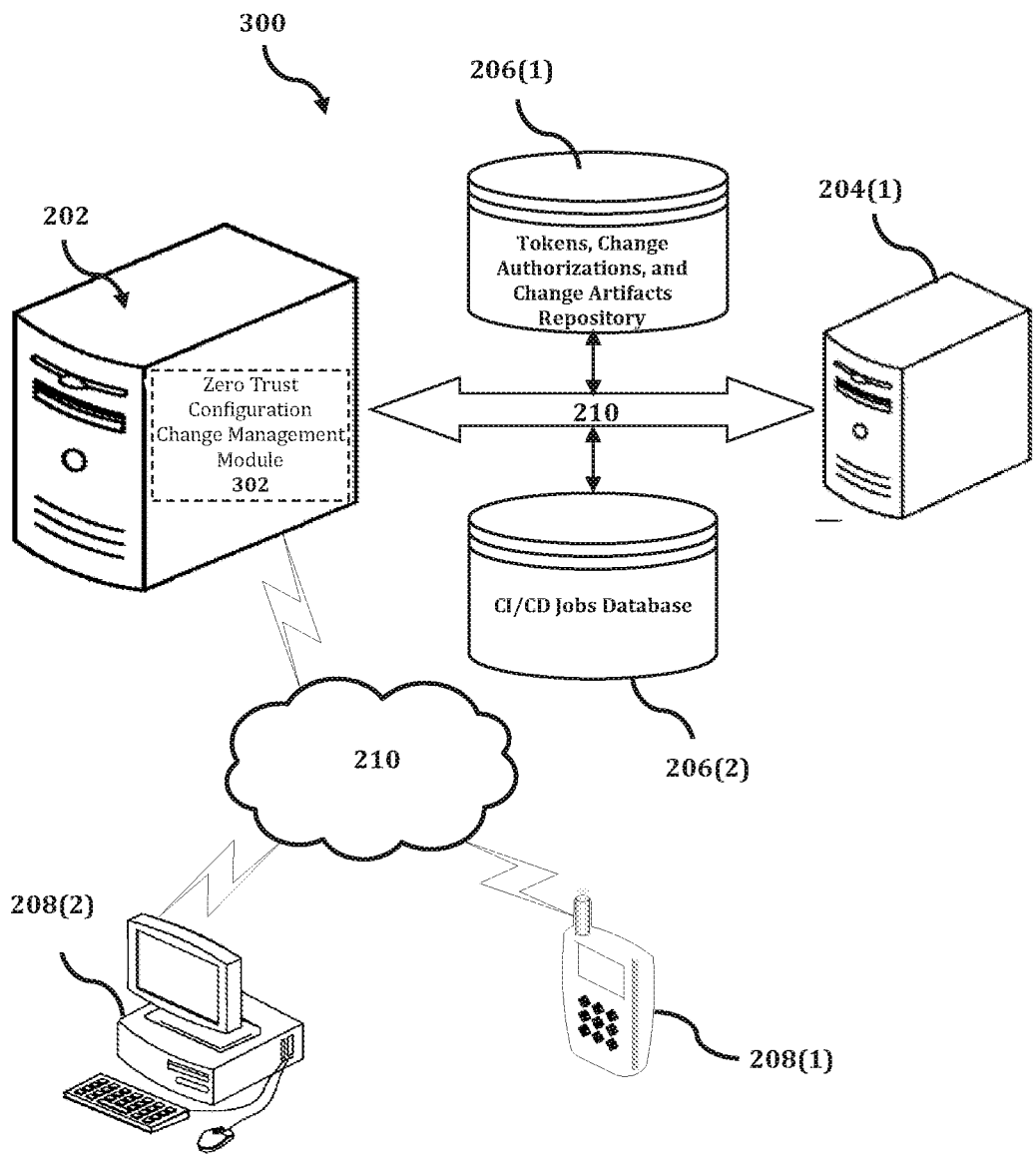
FIG. 3 shows an exemplary system for implementing a method for facilitating identity and access management in a cloud environment based on a zero-trust configuration.

The ZTCCM device 202 is described and shown in FIG. 3 as including a zero-trust configuration change management module 302, although it may include other rules, policies, modules, databases, or applications, for example. As will be described below, the zero-trust configuration change management module 302 is configured to implement a method for facilitating identity and access management in a cloud environment based on a zero-trust configuration.

An exemplary process 300 for implementing a mechanism for facilitating identity and access management in a cloud environment based on a zero-trust configuration by utilizing the network environment of FIG. 2 is shown as being executed in FIG. 3. Specifically, a first client device 208(1) and a second client device 208(2) are illustrated as being in communication with ZTCCM device 202. In this regard, the first client device 208(1) and the second client device 208(2) may be "clients" of the ZTCCM device 202 and are described herein as such. Nevertheless, it is to be known and understood that the first client device 208(1) and/or the second client device 208(2) need not necessarily be "clients" of the ZTCCM device 202, or any entity described in association therewith herein. Any additional or alternative relationship may exist between either or both of the first client device 208(1) and the second client device 208(2) and the ZTCCM device 202, or no relationship may exist.

Further, ZTCCM device 202 is illustrated as being able to access a tokens, change authorizations, and change artifacts repository 206(1) and a CI/CD jobs database 206(2). The zero-trust configuration change management module 302 may be configured to access these databases for implementing a method for facilitating identity and access management in a cloud environment based on a zero-trust configuration.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ZTCCM device 202 via broadband or cellular communication. Of course, these embodiments are merely exemplary and are not limiting or exhaustive.

Upon being started, the zero-trust configuration change management module 302 executes a process for facilitating identity and access management in a cloud environment based on a zero-trust configuration. An exemplary process for facilitating identity and access management in a cloud environment based on a zero-trust configuration is generally indicated at flowchart 400 in FIG. 4.

Figure 4:
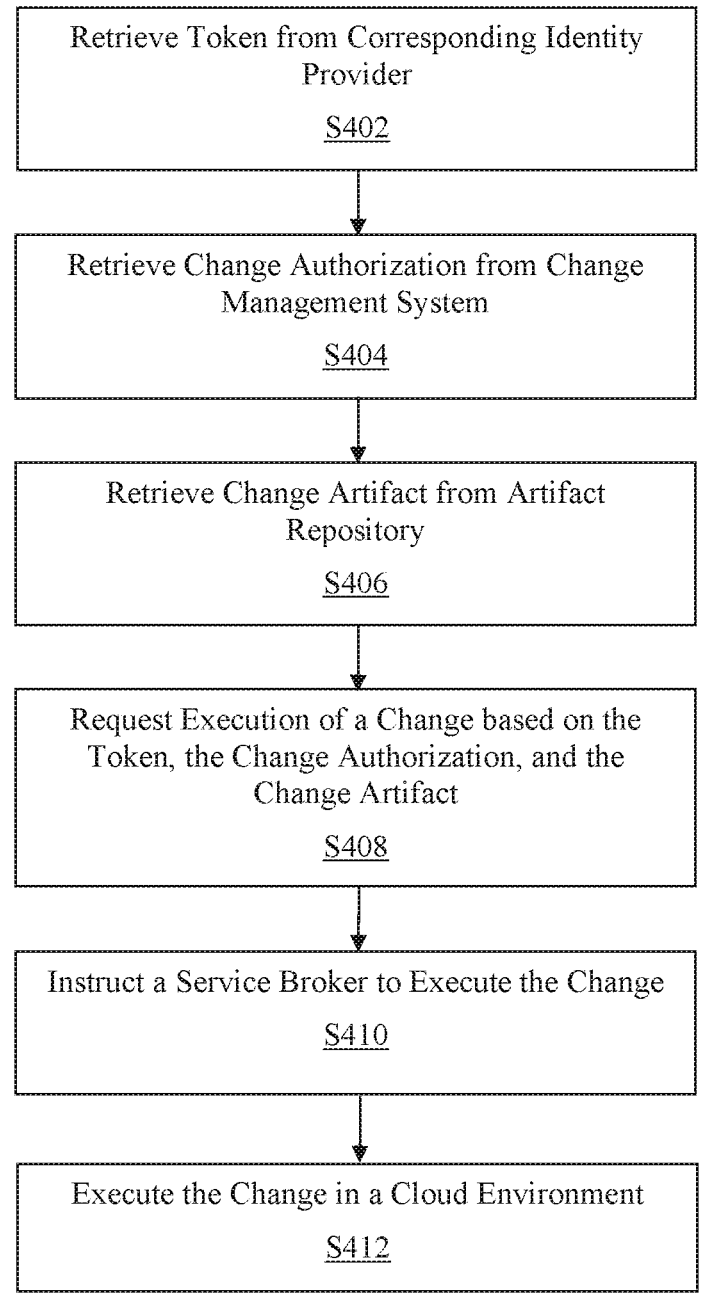
FIG. 4 is a flowchart of an exemplary process for implementing a method for facilitating identity and access management in a cloud environment based on a zero-trust configuration.

In the process 400 of FIG. 4, at step S402, a job may retrieve a token from a corresponding identity provider. The job may include at least one from among a unit of work and a unit of execution that corresponds to a change. The job may also include components such as, for example, a task, a step, and a process. As a process, the job may include connected process groups, job controls, and subprocesses such as, for example, a child process. In an exemplary embodiment, the job may also include at least one from among a continuous integration job and a continuous deployment job that modify at least one from among a cloud environment and an application within the cloud environment.

In another exemplary embodiment, the token may include a cryptographically verifiable payload that contains claims about a principal. The token may include a federated identity assertion token that is exchangeable for a resource specific access token. The token may also include a change authorization token. The change authorization token may include a specific type of access token that can be used to authorize infrastructure change requests sent to a service broker instance. In another exemplary embodiment, the identity provider may include a service provider that creates, maintains, and manages identity information for principals and provides principal authentication to other service providers within a federation, such as with web browser profiles. The principal may include a system actor with a distinct authenticatable identity.

In another exemplary embodiment, the job may retrieve the token by requesting the token from the corresponding identity provider. The request for the token may include a bootstrap identity and a uniform resource identifier. The identity provider may then verify the bootstrap identity in the request. After verification of the bootstrap identity, the identity provider may retrieve an identity attribute from an identity provider directory service, Next, the identity provider requests an issuance authorization from an identity provider policy system. The request for the issuance authorization may include the identity attribute and the uniform resource identifier. The identity provider may then receive a response from the identity provider policy system and transmit the token to the job based on the response.

At step S404, the job may retrieve a change authorization from a change management system. The retrieved change authorization may include a signed change authorization. In another exemplary embodiment, the job may retrieve the change authorization by requesting the change authorization from the change management system. The request for the change authorization may include the token and a change authorization identifier. The change management system may then retrieve a key from a change management identity provider. The change management system may validate the received token based on the key and authorize the request for the change authorization. Then, after the request for the change authorization has been authorized, the change management system may retrieve a change authorization attribute. The change management system may sign payload content corresponding to the job and transmit the change authorization to the job.

At step S406, the job may retrieve a change artifact from an artifact repository. The retrieved change artifact may include a signed change artifact. In another exemplary embodiment, the job may retrieve the change artifact by requesting the change artifact from the artifact repository. The request for the change artifact may include the token and a change plan artifact path. The artifact repository may then retrieve a key from a change management identity provider. The artifact repository may validate the received token based on the key and authorize the request for the change plan. Then, the artifact repository may transmit the change artifact to the job.

At step S408, the job may request a change orchestrator to execute the change. The request may include at least one from among the token, the change authorization, and the change artifact. In an exemplary embodiment, the change orchestrator retrieves a signing key from the change orchestrator local IDP. The change orchestrator then validates the token received from the job. Based on the validation, the change orchestrator may request the change orchestrator local policy engine to authorize the change.

At step S410, the change orchestrator may instruct a service broker to execute the change. In an exemplary embodiment, the service broker may include any one of a plurality of mechanisms that generate a service instance for a consumer of a service based on unique characteristics of the instance such as, for example, a reference to a plan and parameters to the plan. For example, the consumer of the service may request a service instance by providing unique characteristics of a particular instance to the service broker.

In another exemplary embodiment, for each step in the change plan, the change orchestrator obtains a root change authorization token for the change and performs the change via a service broker such as, for example, an open service broker (OSB) that is based on the Open Service Broker specification. To obtain the change authorization token, the change orchestrator may input a requestor access token, a signed change authorization, a signed change plan, and a change step. To perform the change, the change orchestrator may input the change authorization token, a service offering, a plan, and the parameters. Then, at step S412, the service broker may execute the change within the cloud environment via an application programming interface (API).

In another exemplary embodiment, a control model may be utilized to create end-to-end evidence of pre-approval of change. The control model may include requirements such as, for example, process control requirements, OSB control requirements, change plan control requirements, subscription control requirements, environment control requirements, change authorization requirements, as well as change plan and change plan step requirements.

In another exemplary embodiment, the process control requirements may require that all changes must be actioned through an OSB, that the authorized change initiator must directly request the first level of OSB to action the change, that the authorized change initiator must submit a valid change authorization token with any request to an OSB, and that the authorized change initiator may directly request change from more than on OSB as long as each change is authorized by a step in a change plan included in the change authorization. In another exemplary embodiment, the OSB control requirements may require that an OSB must have an assigned uniform resource name (URN).

In another exemplary embodiment, the change plan control requirements may require that a change plan must be a systems development life cycle (SDLC) controlled artifact accessible from a well-controlled, firm approved artifact repository by fully qualified unique name or ID, and that a change plan must address only changes to a single change target and a single change target cannot span subscriptions. In another exemplary embodiment, the environment control requirements may require that each environment must have a URN and that each environment must store, as an element of its URN attributes, a collection of shared service references as URN.

In another exemplary embodiment, the subscription control requirements may require that each subscription must have a URN, that each subscription must be part of one and only one environment such that this environment must be specified as an attribute of its URN, and that a plain English description must be available for each change plan and it must be presented to the authorized change approver at the time of approval of any change authorization that includes that change plan.

In another exemplary embodiment, the change authorization requirements may require that a change authorization may authorize the execution of multiple change plans which may or may not be against different change targets, that when a change authorization includes the execution of multiple change plans, it must specify the order of execution which may be done by reference to a cross plan change workflow, that a cross plan change workflow may be an SDLC artifact managed by those controls, and that when a change authorization includes the execution of change plan steps against the same change target that must occur with change plan steps against one or more other change targets interspersed between them, then only those steps that are to be executed sequentially may be included in any single change plan.

In another exemplary embodiment, the change plan and change plan step requirements may require that each change plan identified in a change authorization must be identified by fully qualified file path in the artifact repository, that the change steps in a change plan must be executed in the order specified in the change plan, that each change step must contain a URN descriptor of the OSB that will execute the change, the action that will be executed, and the parameters of the action, that when change type is deprovision, update, bind, or unbind, the change step may include a URN descriptor to describe an already existing service instance or instances to be includes as the target in the request, that when change type is bind or unbind, the change step may include a URN descriptor to describe the client to be bound, and that processing of a URN descriptor must result in an error when its multiple matches attribute is false and it resolves to more than one URN. In another exemplary embodiment, the client may include a piece of software that interacts with a token issuer in order to retrieve tokes that can be used to authorize interaction with a relying party. The relying party may include a system entity that decides to take an action based on information from another system entity. In a federated trust relationship, an IDP system serves the role of both IDP and relying party.

Figure 5:
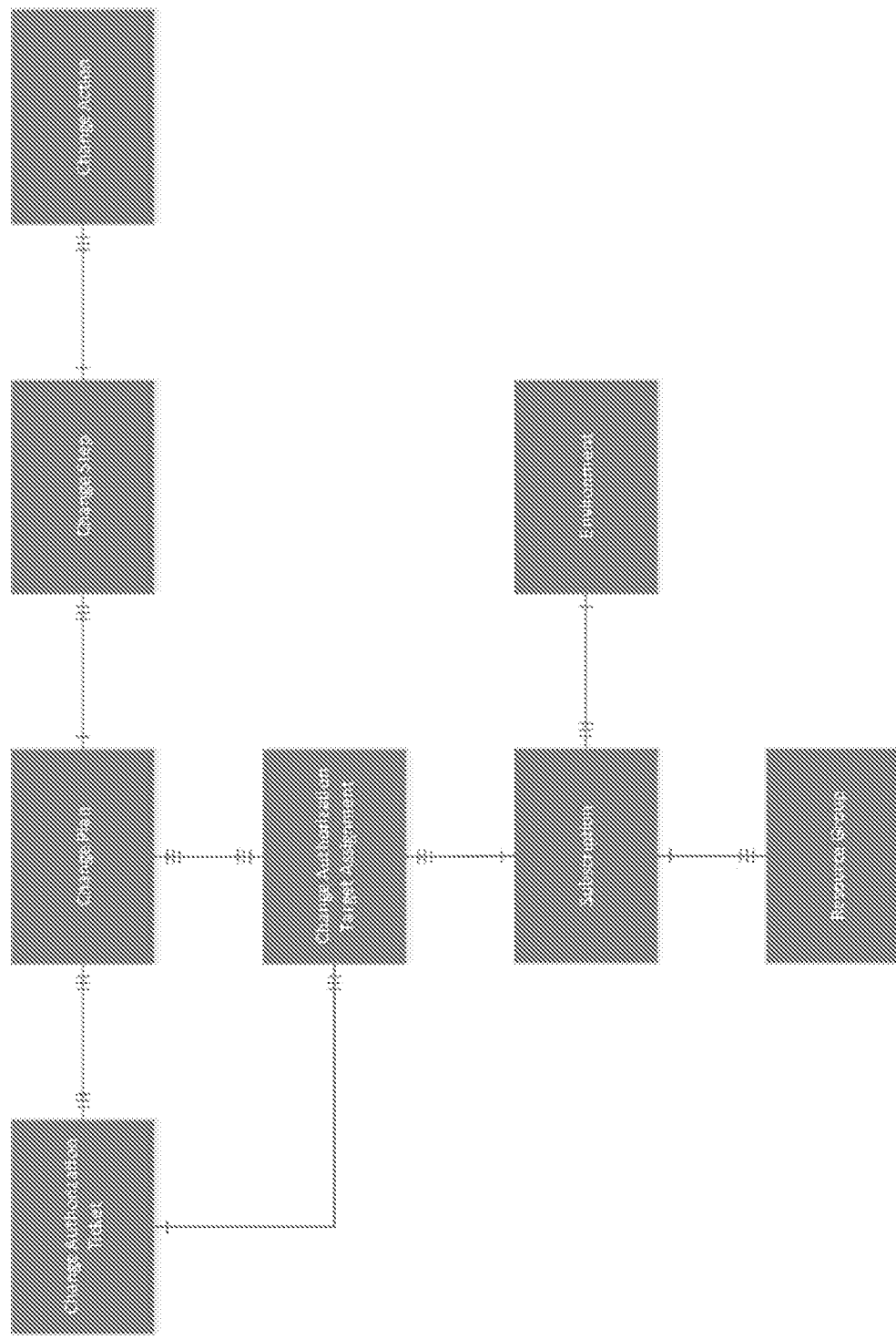
FIG. 5 is a diagram that illustrates a change authorization logical data model that is usable for implementing a method for facilitating identity and access management in a cloud environment based on a zero-trust configuration, according to an exemplary embodiment.

FIG. 5 is a diagram 500 that illustrates a change authorization logical data model that is usable for implementing a method for facilitating identity and access management in a cloud environment based on a zero-trust configuration, according to an exemplary embodiment. Diagram 500 outlines various entities, and the relationship between these entities, that are relevant to the automated change design. As will be appreciated by a person of ordinary skill in the art, each of the entities illustrated in FIG. 5 may relate to a processing component such as, for example, a microservice in a network environment.

As illustrated in FIG. 5, a change authorization ticket entity may have a many-to-many relationship with a change plan entity. The change plan entity may be used by more than one change authorization ticket entity and the change authorization ticket entity may contain more than one change plan entities. The change authorization ticket entity may have a one-to-many relationship with a change authorization target assignment entity. The change authorization target assignment entity may have a many-to-one relationship with a subscription entity. The change plan entity may have a one-to-many relationship with a change step entity. The change plan entity may have one or more change step entities.

Additionally, the change step entity may have a many-to-one relationship with a change action entity. The change action entity may be used by more than one change step entities. The subscription entity may have a one-to-one relationship with an environment entity. The subscription entity may have a one-to-many relationship with the change authorization target assignment entity. The subscription entity may have a one-to-many relationship with a resource group entity. The environment entity may have a one-to-many relationship with the subscription entity.

In an exemplary embodiment, the change authorization ticket entity may be stored in a change authorization ticket system and may include attributes such as, for example, a change authorization ticket identifier attribute, an approved attribute, a target assignments attribute, an authorized change initiators attribute, a change plans attribute, a change window start attribute, and a change window end attribute. The change authorization ticket system may contain the inventory of change authorization tickets including attributes about the change authorization tickets. The change authorization ticket identifier attribute may include a string data type and may correspond with a unique identifier that is usable for identifying a single change authorization ticket entity. The approved attribute may include a Boolean data type and may indicate whether or not the change authorization ticket has been fully approved. The target assignments attribute may include a data type relating to a set of the change authorization target assignment and may correspond to a set of change authorization target assignments that identify the targets that this change authorization ticket authorizes changes for.

The authorized change initiators attribute may include a data type relating to a set of strings and may correspond to a set of identifiers for principals authorized to perform changes defined by this change authorization ticket. The change plans attribute may include a data type relating to a set of the change plan and may correspond to a set of change plan that define the precise changes authorized by this change authorization ticket. The change window start attribute may include a timestamp data type and may correspond to the point in time when the change window begins. The change window end attribute may include a timestamp data type and may correspond to the point in time when the change window ends.

In another exemplary embodiment, the change authorization target assignment entity may identify target that a particular change authorization ticket has authorized changes for, may be stored in a change authorization ticket system, and may include attributes such as, for example, attributes titled "subscription JRN" and "resource group JRN." The resource name attribute may include a string data type and may correspond to a resource name (JRN) of the subscription that is the target of an authorized change. The resource group JRN attribute may include a string data type and may correspond to a JRN of the resource group that is the target of an authorized change. The resource group JRN attribute may not be required to be populated when the change does not target a specific resource group.

In another exemplary embodiment, the change plan entity may be stored as documents in an artifact repository, may be externally referenceable using an associated identifier, and may include attributes such as, for example, a change plan identifier attribute and a change plan steps attribute. The change plan identifier attribute may include a string data type and may correspond with a unique identifier that is usable for identifying the change plan. The change plan steps attribute may include a data type relating to an array of the change plan step and may correspond to an array of change plan step objects that define the change actions to be executed in a specific order.

In another exemplary embodiment, the change plan step entity may be stored within change plan entities and may include attributes such as, for example, a step number attribute, a change description attribute, and a web application programming interface (API) action attribute. The step number attribute may include an integer data type and may correspond to the step number of a particular change in a change plan. The change description attribute may include a string data type and may correspond to plain English descriptions of the change to be made. The web API action attribute may include a web API action data type and may correspond to the web API action object that defines a change action in terms of a canonical web API request.

In another exemplary embodiment, the web API action entity may represent a canonical request for a web API that a change initiator will convert into a real request and send to a web API endpoint to perform an authorized change. The web API action entity may be stored within the change plan step entity and may include attributes such as, for example, a type attribute, an API endpoint uniform resource locator (URL) attribute, an attribute titled "API JRN," a request method attribute, a request body attribute, and a request headers attribute. The type attribute may include a string data type and may correspond to a type of API action. Clients requesting a change will use this web API action object to construct. The API endpoint URL may include a string data type and may correspond to the endpoint URL of the web API.

The API JRN attribute may include a string data type and may correspond to a JRN identifier of the API instance. The request method attribute may include a string data type and pay correspond to actions such as, for example, a put action, a post action, a delete action, and a get action. The request body attribute may include a string data type and may correspond to a string encoded request body. Exemplary payloads may include payloads in JSON format and extensible markup language (XML) format. Content types may be specified as a request header via the request headers field. The request headers attribute may include data types relating to a set of strings and may correspond to a set of request header name/value pairs to be included in the hypertext transfer protocol (HTTP) request.

In another exemplary embodiment, a system of record (SOR) may be defined for each of the entities. The change authorization ticket entity may be stored as database records in a logical system of record such as, for example, a change authorization ticket system. The change authorization target assignment entity may be stored as database records in a logical system of record such as, for example, a change authorization ticket system. The change plan entity may be stored as immutable artifacts that can be resolved using a unique path in a logical system of record such as, for example, an artifact repository.

The change plan step entity may be embedded within a change plan entity and may not be separate standalone artifacts. The web API action entity may be embedded within a change plan step artifact and may not be separate standalone artifacts. The service plan entity may be stored as attributes of a JRN document in a logical system of record such as, for example, a JRN naming service and may not be separate standalone JRN documents. The parameter entity may be stored as attributes of a JRN document in a logical system of record such as, for example, a JRN naming service and may not be separate standalone JRN documents. The service instance JRN document entity may be stored in a JRN naming service logical system of record. The service binding JRN document entity may be stored in a JRN naming service logical system of record. The JRN naming service may include a service that provides JRN document creation, retrieval, and search capabilities.

Figure 6:
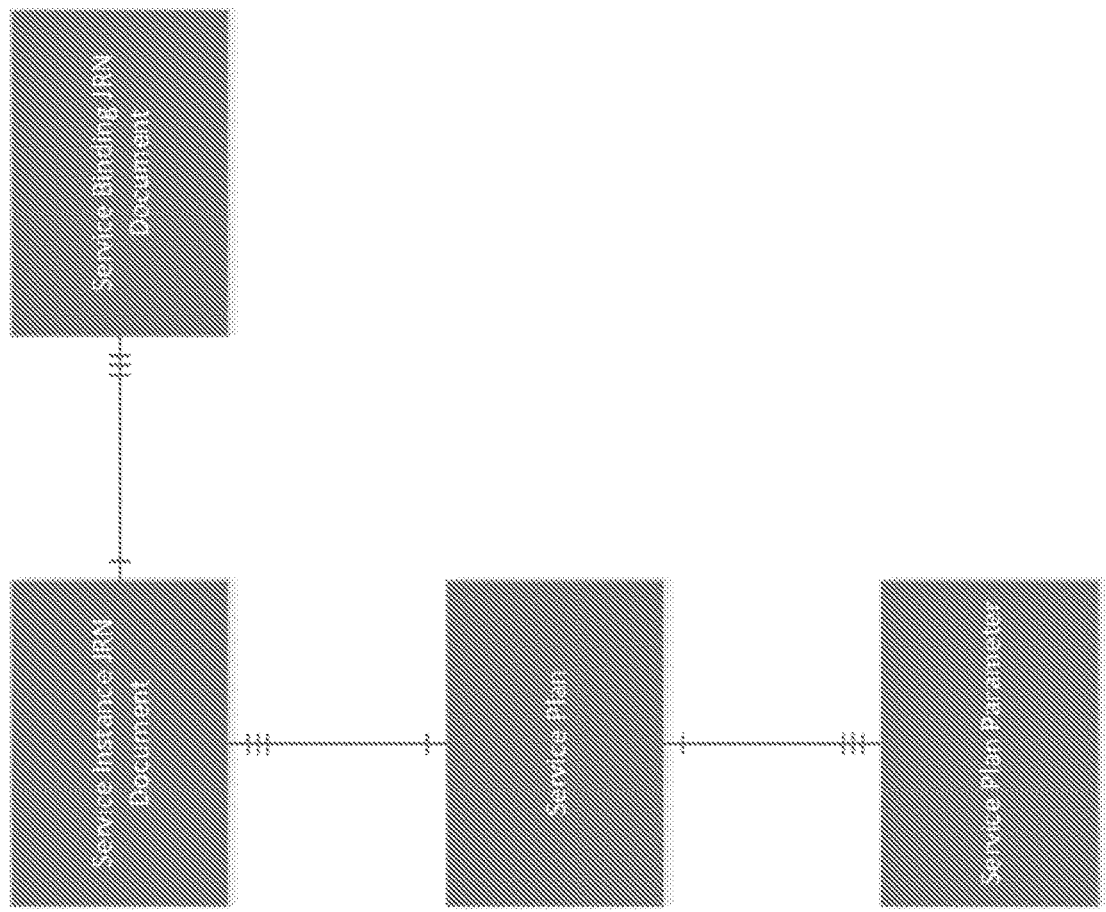
FIG. 6 is a diagram that illustrates a service instance and bindings logical data model that is usable for implementing a method for facilitating identity and access management in a cloud environment based on a zero-trust configuration, according to an exemplary embodiment.

FIG. 6 is a diagram 600 that illustrates a service instance and bindings logical data model that is usable for implementing a method for facilitating identity and access management in a cloud environment based on a zero-trust configuration, according to an exemplary embodiment. Diagram 600 outlines various service instances and bindings, and the relationship between these entities, that are relevant to the automated change design. As will be appreciated by a person of ordinary skill in the art, each of the entities illustrated in FIG. 6 may relate to a processing component such as, for example, a microservice in a network environment.

As illustrated in FIG. 6, an entity titled "service instance JRN document" may have a one-to-many relationship with an entity titled "service binding JRN document." The resource name (JRN) document entity may have a many-to-one relationship with a service plan entity. In turn, the service plan entity may have a one-to-many relationship with a service plan parameter entity.

In an exemplary embodiment, the service instance JRN document entity may describe a service instance created by an open service broker (OSB). The service instance JRN document entity may be stored within a JRN naming service managed by the OSB that created the corresponding service instance and may include attributes such as, for example, a service instance JRN attribute, a service plan JRN attribute, a service plan parameters attribute, a security identity JRN attribute, a service instance consumer bindings attribute, and a service instance provider bindings attribute. The service instance JRN attribute may include a string data type and may correspond to a JRN that identifies a service instance. The service plan JRN attribute may include a string data type and may correspond to the service plan used to create the JRN object.

The service plan parameters attribute may include data types relating to a list of parameters and may correspond to the service plan parameters used to create the service instance. The security identity JRN attribute may include a string data type and may correspond to the principal identity that the service instance runs as. The service instance consumer bindings attribute may include data types relating to a list of strings and may correspond to a list of binding JRN that represent bindings a particular service instance has with other service instances. For example, the list of bindings to service instances where the particular service instance is the service consumer. The service instance provider bindings attribute may include data types relating to a list of strings and may correspond to a list of binding JRN that represent bindings other service instances have with a particular service instance. For example, the list of bindings to service instances where the particular service instance is the service provider.

In another exemplary embodiment, the service plan entity may describe a service plan as advertised by an OSB catalog. The service plan entity may be stored within a JRN document as attributes and not stored as standalone JRN documents. The service plan entity may include attributes such as, for example, a service plan identifier attribute and an open service broker instance JRN attribute. The service plan identifier attribute may include a string data type and may correspond to a unique identifier of the plan within a catalog of the open service broker. The open service broker instance JRN attribute may include a string data type and may correspond to the JRN of the open service broker instance that provides the identified service plan.

In another exemplary embodiment, the service binding JRN document entity may describe a service binding created by an OSB. The service binding JRN document entity may be stored within a JRN naming service managed by the OSB that created the corresponding binding and may include attributes such as, for example, a service binding JRN attribute, a consumer service instance JRN attribute, a provider service instance JRN attribute, a type attribute, and a binding parameters attribute. The service binding JRN attribute may include a string data type and may correspond to a JRN that identifies the service binding.

The consumer service instance JRN attribute may include a string data type and may correspond to the JRN of the service instance that is the service consumer in the bind relationship. The provider service instance JRN may include a string data type and may correspond to the JRN of the service instance that is the service provider in the bind relationship. The type attribute may include a string data type and may correspond to the type of binding as defined in the OSB specification. The binding parameters attribute may include data types relating to a list of parameters and may correspond to a list of parameters that define the configuration state of the bind.

In another exemplary embodiment, the service plan parameters entity may include parameter name/value pairs used to describe service instances and bindings. The service plan parameters entity may be stored within a JRN document as attributes and not stored as standalone JRN documents. The service plan parameters entity may include attributes such as, for example, a name attribute and a value attribute. The name attribute may include a string data type and may correspond to a name of a service plan parameter. The value attribute may include a data type such as, for example, a string, a set, and an array that corresponds to values of a service plan parameter.

Figure 7:
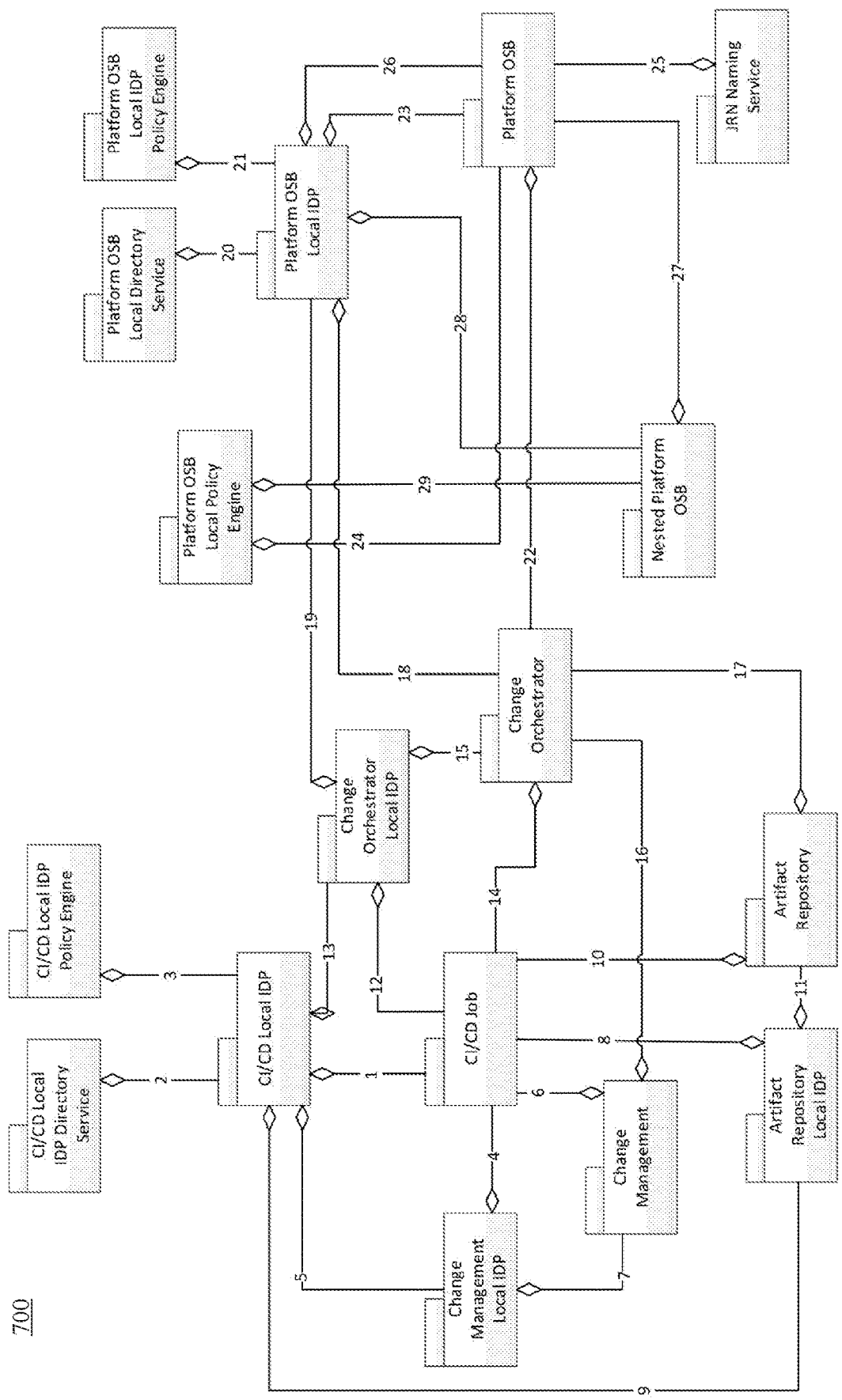
FIG. 7 is a continuous integration and continuous deployment platform integration diagram that illustrates a process that is usable for implementing a method for facilitating identity and access management in a cloud environment based on a zero-trust configuration, according to an exemplary embodiment.

FIG. 7 is a continuous integration and continuous deployment platform integration diagram 700 that illustrates a process that is usable for implementing a method for facilitating identity and access management in a cloud environment based on a zero-trust configuration, according to an exemplary embodiment.

As illustrated in FIG. 7, at step 1, a continuous integration/continuous deployment (CI/CD) job may interact with a CI/CD local identity provider (IDP) to retrieve federated identity assertions and/or tokens. The CI/CD job may correspond to a job that makes changes within a cloud platform for the platform as a whole and/or for an application within the platform. The CI/CD local IDP may be used by the client to authenticate the client using its bootstrap identity and return a federated identity assertion that a service broker IDP will accept in return. At step 2, a CI/CD local IDP may interact with a CI/CD local IDP directory service to authenticate the principal and retrieve identity attribute. The CI/CD local IDP directory service may contain attributes about the principal identity of CI/CD job instances issued as claims. In another exemplary embodiment, the claim may include an attribute name (represented as a string) and value (represented as a string) contained within a cryptographically verifiable payload provided by an issuer identified within the payload.

At step 3, the CI/CD local IDP may interact with a CI/CD local IDP policy engine to determine whether the principal is authorized to receive an access token for the requested resource. The CI/CD local IDP policy engine may be responsible for executing policy for issuing tokens used to federate with the OSB local IDP. At step 4, the CI/CD local IDP may interact with a change management local IDP to retrieve access token for the change management system. At step 5, the change management local IDP may interact with the CI/CD local IDP to retrieve token signing public keys for verifying access tokens. At step 6, the CI/CD job may interact with the change management to retrieve a signed change authorization for a specific change. The CI/CD job may also request a signed authorization payload for this particular change in accordance with this step in this change plan authorized by this change authorization targeting this subscription. As such, one token request is initiated per change.

At step 7, the change management may interact with a change management local IDP to retrieve token signing public keys for verifying access tokens. At step 8, the CI/CD job may interact with an artifact repository local IDP to retrieve an access token for an artifact repository. The artifact repository local IDP may include an IDP that issues access tokens expected by an artifact repository containing change plans. At step 9, the artifact repository local IDP may interact with the CI/CD local IDP to retrieve token signing public keys for verifying access tokens. At step 10, the CI/CD job may interact with an artifact repository to retrieve signed change plans in a format such as, for example, a JSON document format. The artifact repository may contain immutable versioned artifacts including change plan and change plan step artifacts. The artifact repository may exist within the same security domain and availability zone as the CI/CD platform.

At step 11, the artifact repository may interact with an artifact repository local IDP to retrieve token signing public keys for verifying the access tokens. At step 12, the CI/CD job may interact with a change orchestrator local IDP to retrieve access token for a change orchestrator. The change orchestrator may include a system that invokes one or more OSB to orchestrate a change as authorized by a change authorization ticket and described by a change plan.

At step 13, the change orchestrator local IDP may interact with a CI/CD local IDP to retrieve token signing public keys for verifying the access tokens. The change orchestrator local IDP may include an IDP that issues access tokens expected by a change orchestrator. At step 14, a CI/CD job may interact with a change orchestrator to request a specifically authorized change. At step 15, the change orchestrator may interact with a change orchestrator local IDP to retrieve token signing public keys for verifying access tokens. At step 16, the change orchestrator may interact with the change management to retrieve public keys for verifying signed change authorization payloads.

At step 17, the change orchestrator may interact with the artifact repository to retrieve public keys for verifying signed change plans. At step 18, the change orchestrator may interact with a platform OSB local IDP to retrieve an access token for an OSB API. The platform OSB local IDP may include an IDP that issues change authorization tokens expected by a service broker API and accepts federated identity assertions from the CI/CD local IDP for authentication. A custom library may be used to issue change authorization claims and invoke an external policy engine.

At step 19, the platform OSB local IDP may interact with the change orchestrator local IDP to retrieve token signing public keys for verifying federated assertions. At step 20, the platform OSB local IDP may interact with the platform OSB local IDP directory service to retrieve identity attributes about the principal. The platform OSB local IDP directory service may contain attributes about the principal identity of service broker clients issued as claims.

At step 21, the platform OSB local IDP may interact with the platform OSB local IDP policy engine to determine whether the principal is authorized to receive an access token for the requested OSB API resource. The platform OSB local IDP policy engine may be responsible for executing policy for issuing tokens for making changes via an OSB API. At step 22, the change orchestrator may interact with the platform OSB to perform a specific change such as, for example, creating/updating/deleting a service instance and/ or binding. The platform OSB may include an OSB invoked by a change orchestrator. At step 23, the platform OSB may interact with the platform OSB local IDP to retrieve token signing public keys for verifying the access tokens.

At step 24, the platform OSB may interact with the platform OSB local policy engine to determine whether the principal is authorized to receive an access token for the requested OSB API resource. The platform OSB local policy engine may be responsible for executing policy for validating the authorization to make a specific change via an OSB API. At step 25, the platform OSB may interact with the JRN naming service to create a versioned JRN with a set of attributes. The JRN naming service may include a service that provides JRN document creation, retrieval, and search capabilities. At step 26, the platform OSB may interact with the platform OSB local IDP to exchange an access token where this platform OSB is the audience for a new access token where a nested platform OSB is the audience. The nested platform OSB may include an OSB invoked by another OSB.

At step 27, the platform OSB may interact with the nested platform OSB to perform a specific change such as, for example, creating/updating/deleting a service instance or binding. At step 28, the nested platform OSB may interact with the platform OSB local IDP to retrieve token signing public keys for verifying access tokens. At step 29, the platform OSB may interact with the platform OSB local policy engine to determine whether the principal is authorized to receive an access token for the requested OSB API resource.

In another exemplary embodiment, the platform local IDP may authenticate clients using bootstrap identity assertions (tokens) and returns a platform identity assertion that can be used for federated authentication to a partition local IDP. The CI/CD local IDP may authenticate principals in the context of a CI/CD job instance and issues federated identity assertions that can be used for federated authentication to a service broker local IDP. The OSB local IDP may issue tokens for open service broker API. The service provider local IDP may include an IDP that issues tokens for relying party applications deployed on any platform.

Figure 8:
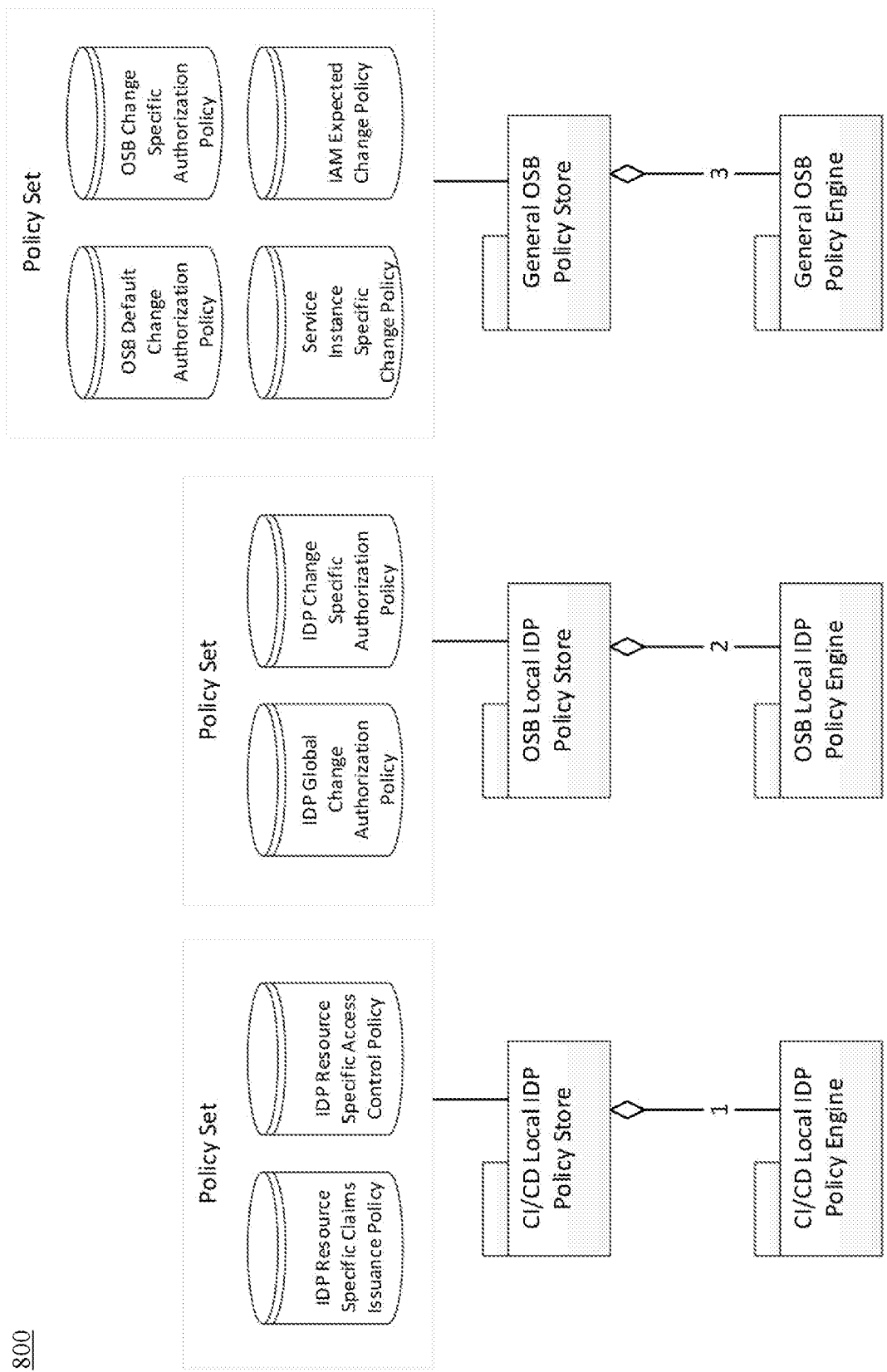
FIG. 8 is a policy engine and policy store integration diagram that illustrates a process that is usable for implementing a method for facilitating identity and access management in a cloud environment based on a zero-trust configuration, according to an exemplary embodiment.

FIG. 8 is a policy engine and policy store integration diagram 800 that illustrates a process that is usable for implementing a method for facilitating identity and access management in a cloud environment based on a zero-trust configuration, according to an exemplary embodiment. The policy store may provide storage of policies for authorizing token issuance and OSB change requests.

As illustrated in FIG. 8, at step 1, a CI/CD local IDP policy engine may interact with a CI/CD local IDP policy engine to retrieve policies needed for claims issuance authorization in the CI/CD domain. At step 2, an OSB local IDP policy engine may interact with an OSB local IDP policy store to retrieve global and change specific authorization policies. At step 3, a general OSB local policy engine may interact with a general OSB local policy store to retrieve default change authorization policy, change specific authorization policy, service instance specific change authorization policy, and expected identity and access management (IAM) change policy.

In FIG. 8, the IDP global change authorization policy may include an IDP that will utilize the policy engine to complete validations to determine authorization of the requestor to get a token based on the request submitted and the retrieved principal identity attributes. The validations may include, for example, validation of the authenticated principal is authorized to perform changes in the identified subscription, environment, and resource group by checking for corresponding provisioned entitlement in the directory service, validation of the identified change authorization lists the user as an authorized change initiator, validation of the identified change authorization contains the identified change plan, validation of the identified change authorization contains the identified change plan step, validation of the identified change authorization contains the identified subscription as a change target, validation of the identified change authorization contains the identified environment as a change target, validation of the identified environment matches the actual environment of the identified subscription, and validation of the identified change authorization contains the identified resource group as a change target.

The IDP change specific authorization policy may be used in cases where specific changes require special authorization rules not evaluated by the IDP partition change authorization policy. The OSB default change authorization policy may include an OSB that will utilize the policy engine to complete default validations to determine authorization of the requestor to execute the request based on the authorization token and request submitted. The default validations may include, for example, validation of the identified service identifier (ID) matches the service ID claim in the change authorization token, validation of the identified plan ID matches the plan ID claim in the change authorization token, validation of the identified target subscription matches the subscription evidence claim in the change authorization token, validation of the identified target environment matches the environment evidence claim in the change authorization token, and validation of the contents of the identified change plan step artifact match the contents of the OSB API request.

The OSB change specific authorization policy may be used in cases where the IDP or an OSB requires additional evaluation beyond what is provided in the OSB default change authorization policy for a specific type of change. The service instance specific change policy may be used to authorize OSB API actions against a specific service instance (e.g., bind). The service instance specific change policy may include an IAM expected change upon creation of a service instance by an OSB. The IAM expected change policy may define the expected IAM changes when a new service instance is created by an OSB. The expected change policies may be published for each service plan offered by a version of an OSB as part of the OSB SDLC process during creation/update of an OSB. The IDP resource specific claims issuance policy may define the claims that should be issued for a specific resource. The IDP resource specific access control policy may define rules for when an IDP should issue a token for a principal and resource combination.

Figure 9A:
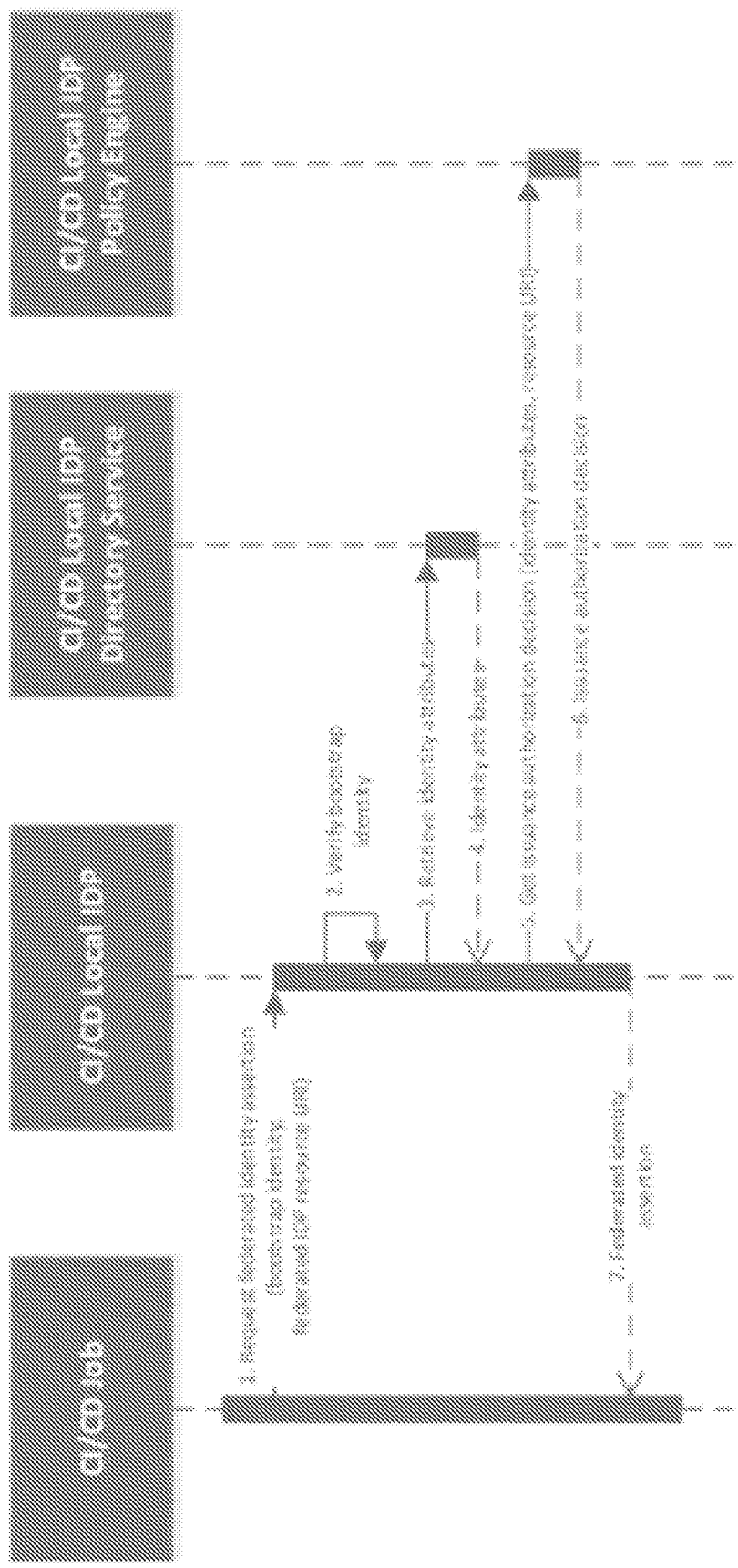
FIG. 9A is a unified modeling language sequence diagram that illustrates a first process of a sequence that is usable for implementing a method for facilitating identity and access management in a cloud environment based on a zero-trust configuration, according to an exemplary embodiment.

FIG. 9A is a unified modeling language sequence diagram 900A that illustrates a first process of a sequence that is usable for implementing a method for facilitating identity and access management in a cloud environment based on a zero-trust configuration, according to an exemplary embodiment.

As illustrated in FIG. 9A, a CI/CD job may retrieve a federated identity assertion token from its local IDP using bootstrap identity for authentication. The federated identity assertion may be exchanged for a resource specific access token. The audience of the federated identity assertion may include a federated IDP and, as such, this sequence is executed for each IDP the CI/CD job needs an access token from. The first process may be executed within the tenant domain.

Figure 9B:
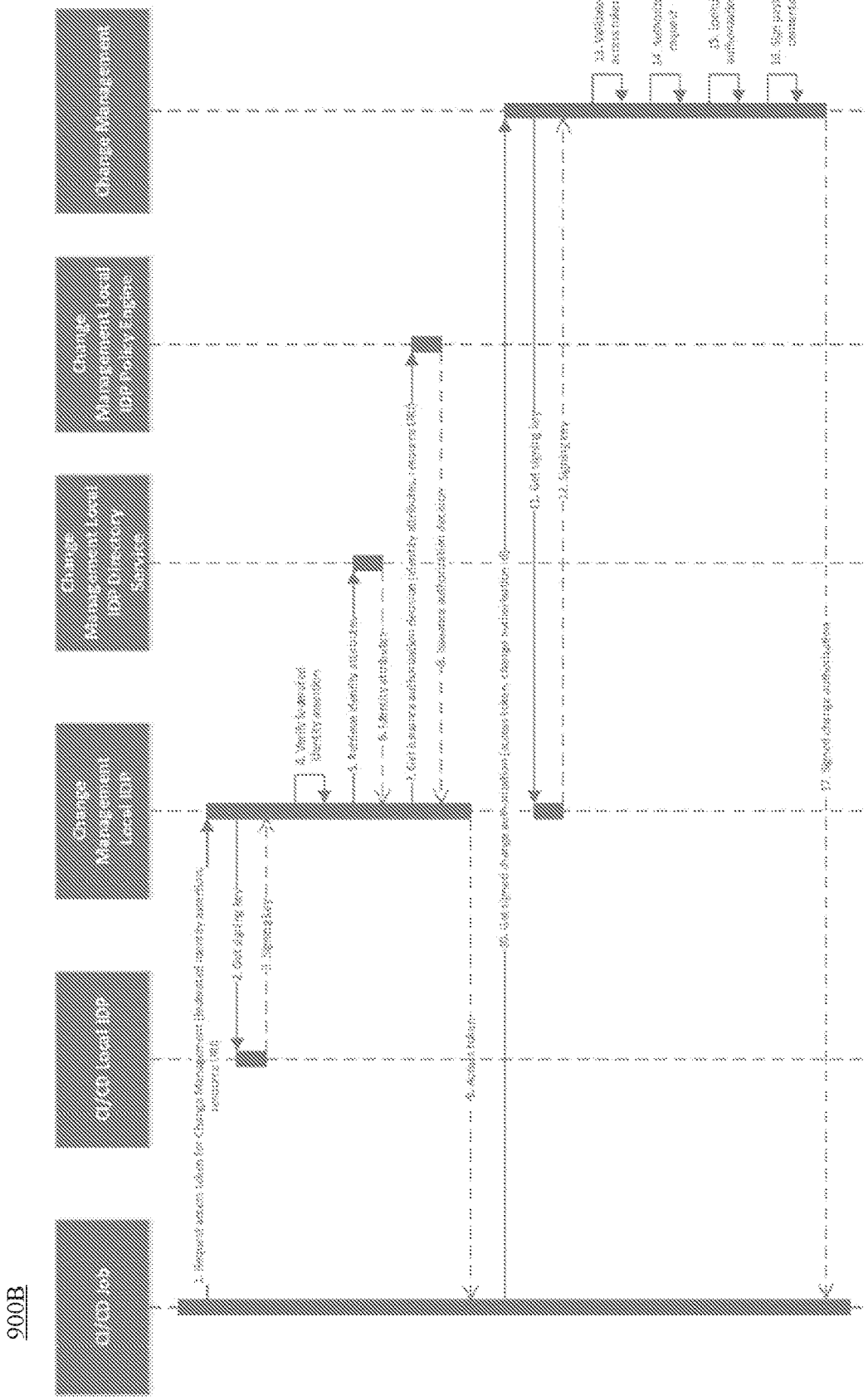
FIG. 9B is a unified modeling language sequence diagram that illustrates a second process of a sequence that is usable for implementing a method for facilitating identity and access management in a cloud environment based on a zero-trust configuration, according to an exemplary embodiment.

FIG. 9B is a unified modeling language sequence diagram 900B that illustrates a second process of a sequence that is usable for implementing a method for facilitating identity and access management in a cloud environment based on a zero-trust configuration, according to an exemplary embodiment. As illustrated in FIG. 9B, the CI/CD job may retrieve a signed change authorization for an approved change authorization ticket. The second process may be executed within the tenant domain.

Figure 9C:
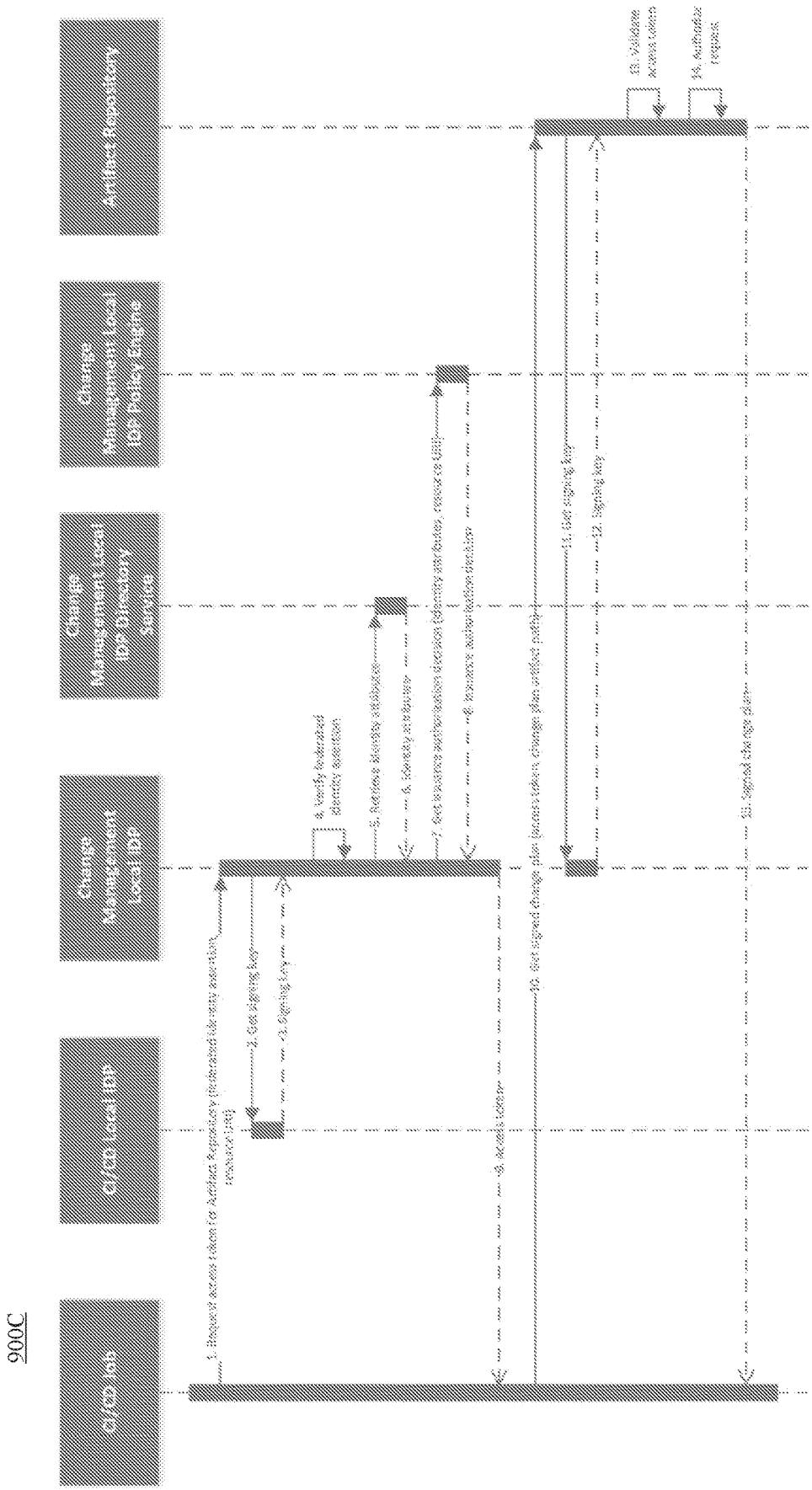
FIG. 9C is a unified modeling language sequence diagram that illustrates a third process of a sequence that is usable for implementing a method for facilitating identity and access management in a cloud environment based on a zero-trust configuration, according to an exemplary embodiment.

FIG. 9C is a unified modeling language sequence diagram 900C that illustrates a third process of a sequence that is usable for implementing a method for facilitating identity and access management in a cloud environment based on a zero-trust configuration, according to an exemplary embodiment. As illustrated in FIG. 9C, the CI/CD job may retrieve a signed change artifact from an artifact repository. The change artifact may contain information for orchestrating the execution of a specific change. The third process may be executed within the tenant domain.

Figure 9D:
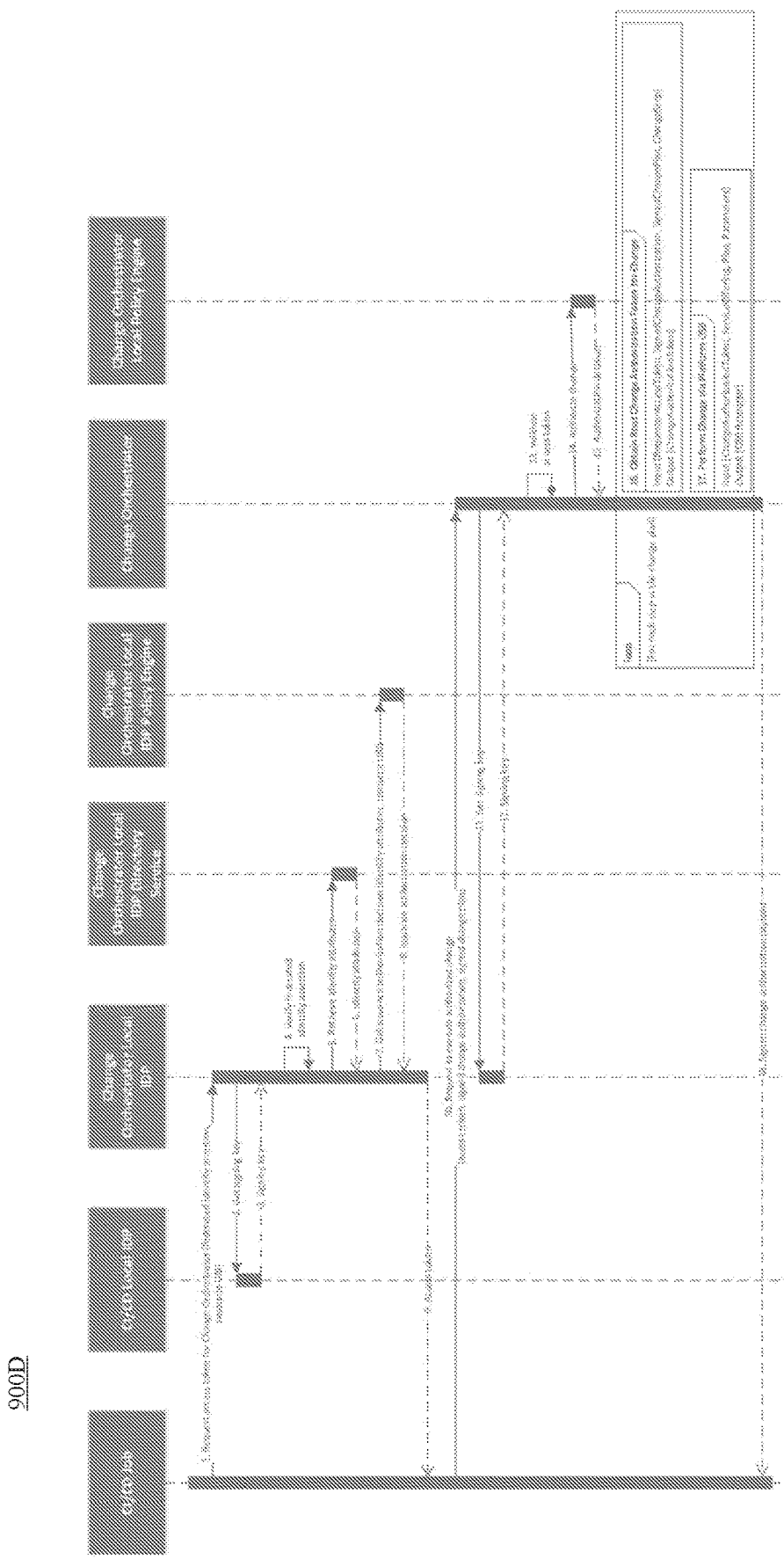
FIG. 9D is a unified modeling language sequence diagram that illustrates a fourth process of a sequence that is usable for implementing a method for facilitating identity and access management in a cloud environment based on a zero-trust configuration, according to an exemplary embodiment.

FIG. 9D is a unified modeling language sequence diagram 900D that illustrates a fourth process of a sequence that is usable for implementing a method for facilitating identity and access management in a cloud environment based on a zero-trust configuration, according to an exemplary embodiment. As illustrated in FIG. 9D, the CI/CD job may request that a change be performed via a change orchestrator. The fourth process may be executed across the tenant and cloud domains.

Figure 9E:
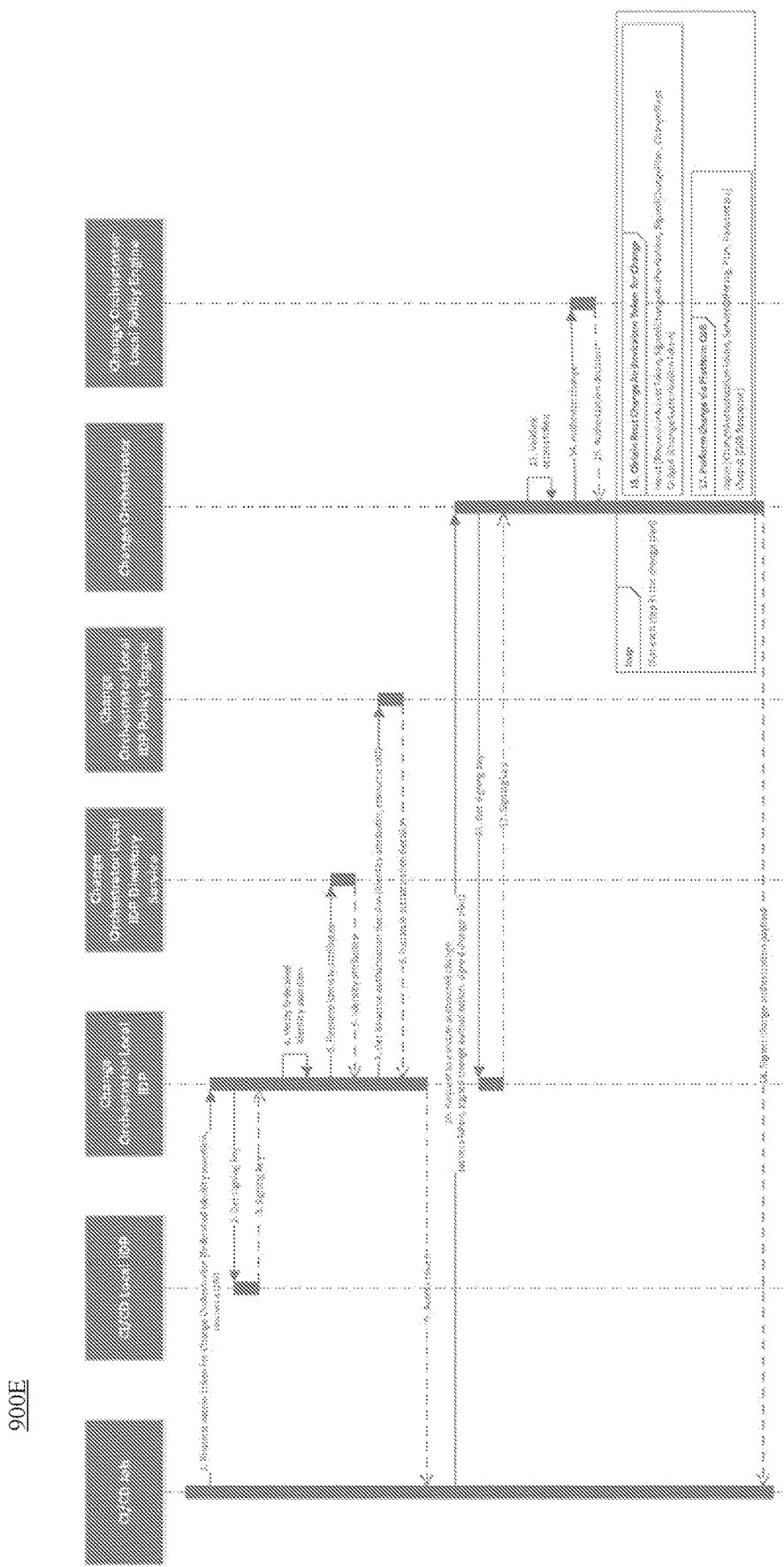
FIG. 9E is a unified modeling language sequence diagram that illustrates a fifth process of a sequence that is usable for implementing a method for facilitating identity and access management in a cloud environment based on a zero-trust configuration, according to an exemplary embodiment.

FIG. 9E is a unified modeling language sequence diagram 900E that illustrates a fifth process of a sequence that is usable for implementing a method for facilitating identity and access management in a cloud environment based on a zero-trust configuration, according to an exemplary embodiment. As illustrated in FIG. 9E, the change orchestrator may call a platform OSB to execute a change within the platform. The fifth process may be executed in the cloud domains.

Figure 9F:
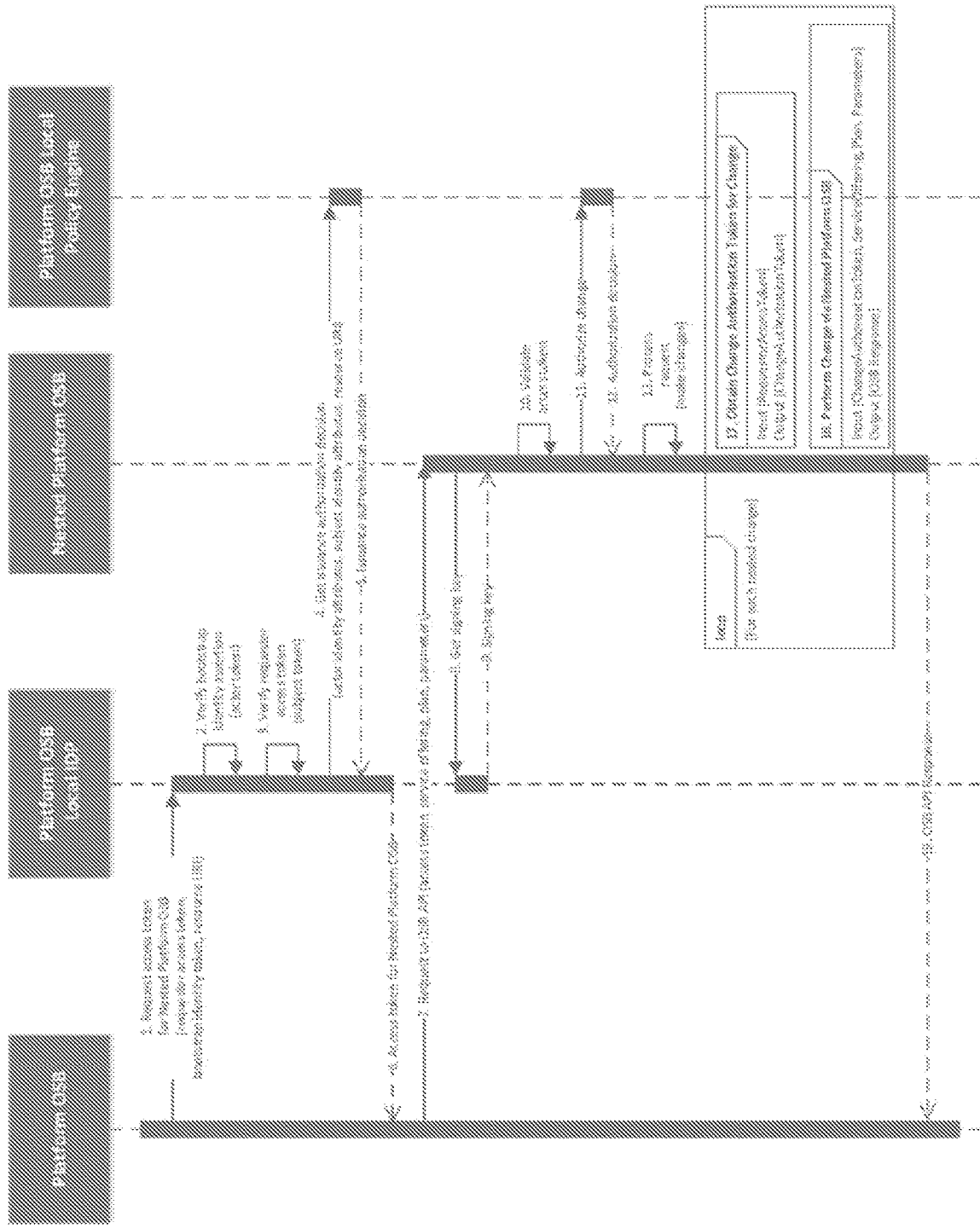
FIG. 9F is a unified modeling language sequence diagram that illustrates a sixth process of a sequence that is usable for implementing a method for facilitating identity and access management in a cloud environment based on a zero-trust configuration, according to an exemplary embodiment.

FIG. 9F is a unified modeling language sequence diagram 900F that illustrates a sixth process of a sequence that is usable for implementing a method for facilitating identity and access management in a cloud environment based on a zero-trust configuration, according to an exemplary embodiment. As illustrated in FIG. 9F, the platform OSB may call a nested platform OSB to execute a change within the platform. The sixth process may be executed within the cloud domain.

In an exemplary embodiment, the platform OSB may request an access token for nested platform OSB from a platform OSB local IDP. The request may include the requestor access token, the bootstrap identity token, and the resource uniform resource identifier (URI). The platform OSB local IDP may verify the bootstrap identity assertion and verify the requestor access token. The platform OSB may then get an issuance authorization decision from a platform OSB local policy engine. Based on the issuance authorization decision, the platform OSB local IDP transmits the access token for nested platform OSB to the platform OSB.

The platform OSB may then transmit a request to OSB API of the nested platform OSB. The request may include an access token, a service offering, a plan, and corresponding parameters. The nested platform OSB may get signing keys from the platform OSB local IDP and validate the access token. Then, the nested platform OSB might request a change authorization from the platform OSB local policy engine. Based on the change authorization, the nested platform OSB may process the request by initiating the changes. For each nested change, the nested platform OSB obtains a change authorization token for the change and performs the change via a nested platform OSB. To obtain the change authorization token, the nested platform OSB may input a requestor access token. To perform the change, the nested platform OSB may input the change authorization token, a service offering, a plan, and the parameters.

Figure 10:
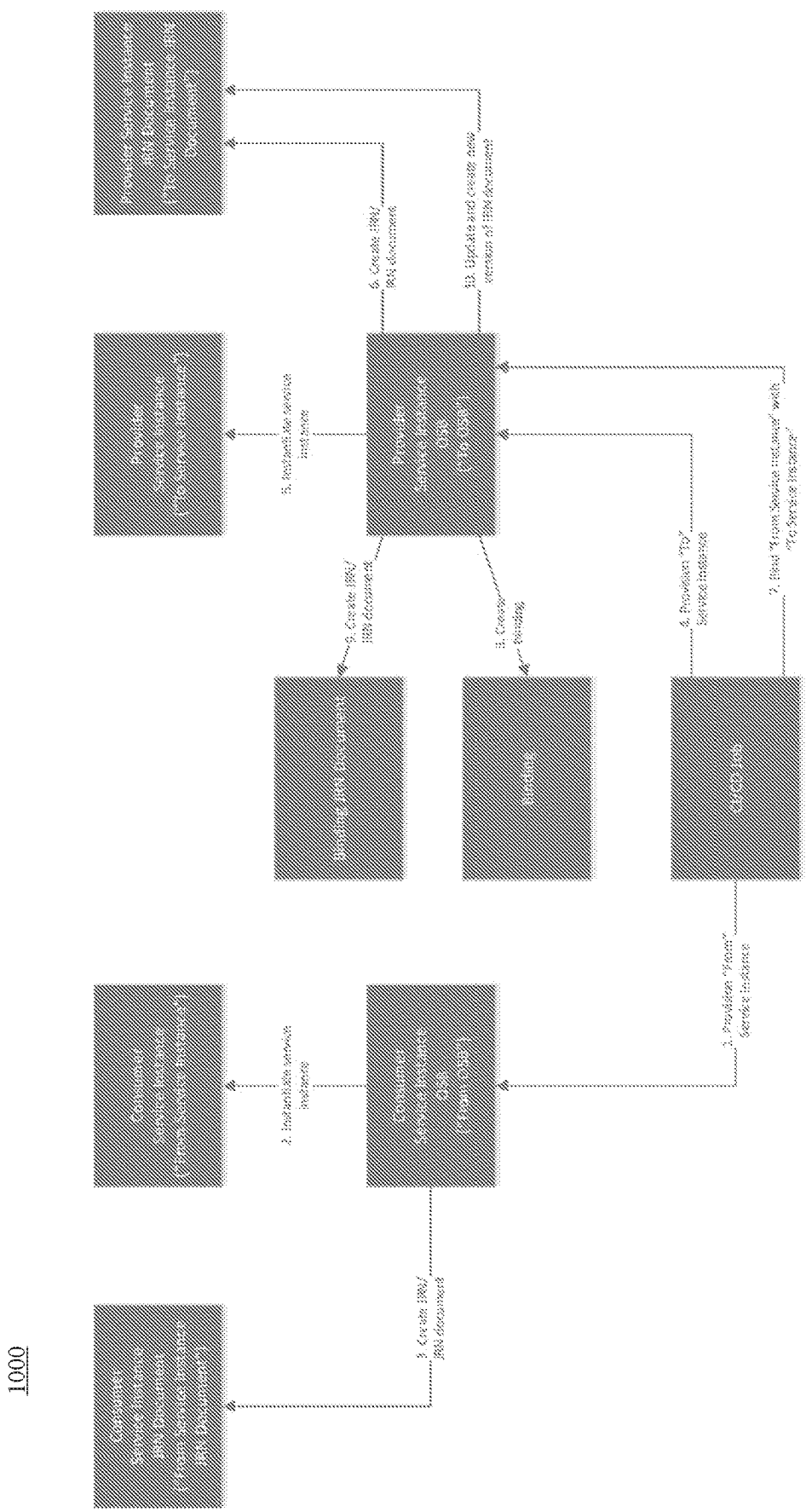
FIG. 10 is a service binding scenario diagram that illustrates a process that is usable for implementing a method for facilitating identity and access management in a cloud environment based on a zero-trust configuration, according to an exemplary embodiment.

FIG. 10 is a service binding scenario diagram 1000 that illustrates a process that is usable for implementing a method for facilitating identity and access management in a cloud environment based on a zero-trust configuration, according to an exemplary embodiment. In an exemplary embodiment, the OSB spec service instance binding may require that the platform supply a service instance identifier (ID), service ID, and plan ID of the target service instance that an identified application will be bound to.

As illustrated in FIG. 10, in a binding scenario where the "To" and "From" service instances are created using different OSBs, the "To OSB" would be used to perform the bind. The "To" and "From" service instances would have distinct JRN and JRN documents that identify and describe them. To keep track of the bindings via JRN document attributes, an OSB would need to perform some JRN document related updates during an OSB API bind action that results in a new version of a JRN document. The "To OSB" would only have permission to create new versions of the "To Service Instance JRN Document" but presumably not the "From Service Instance JRN Document" since the latter is managed by the "From OSB." The "To Service Instance JRN Document" could be updated by the "To OSB" to track the service instances bound to it as consumers during the OSB API bind action at the "To OSB."

Given that an OSB can only update service instance JRN documents under their management that identify target service instances (the "To Service Instance") of a bind operation, the service instances that represent the "application" (using OSB spec nomenclature) in the bind (the "From" in our nomenclature) have their own JRN documents that a "To OSB" presumably will not have permission to update in order to establish bi-directional linkage between the "From" and "To" service instance JRN documents. Every binding needs to have its own JRN document that contains both the "To" and "From" service instance JRN as attributes and the binding JRN naming service must support querying for binding JRN using these attributes to support bi-directional repave.

Figure 11:
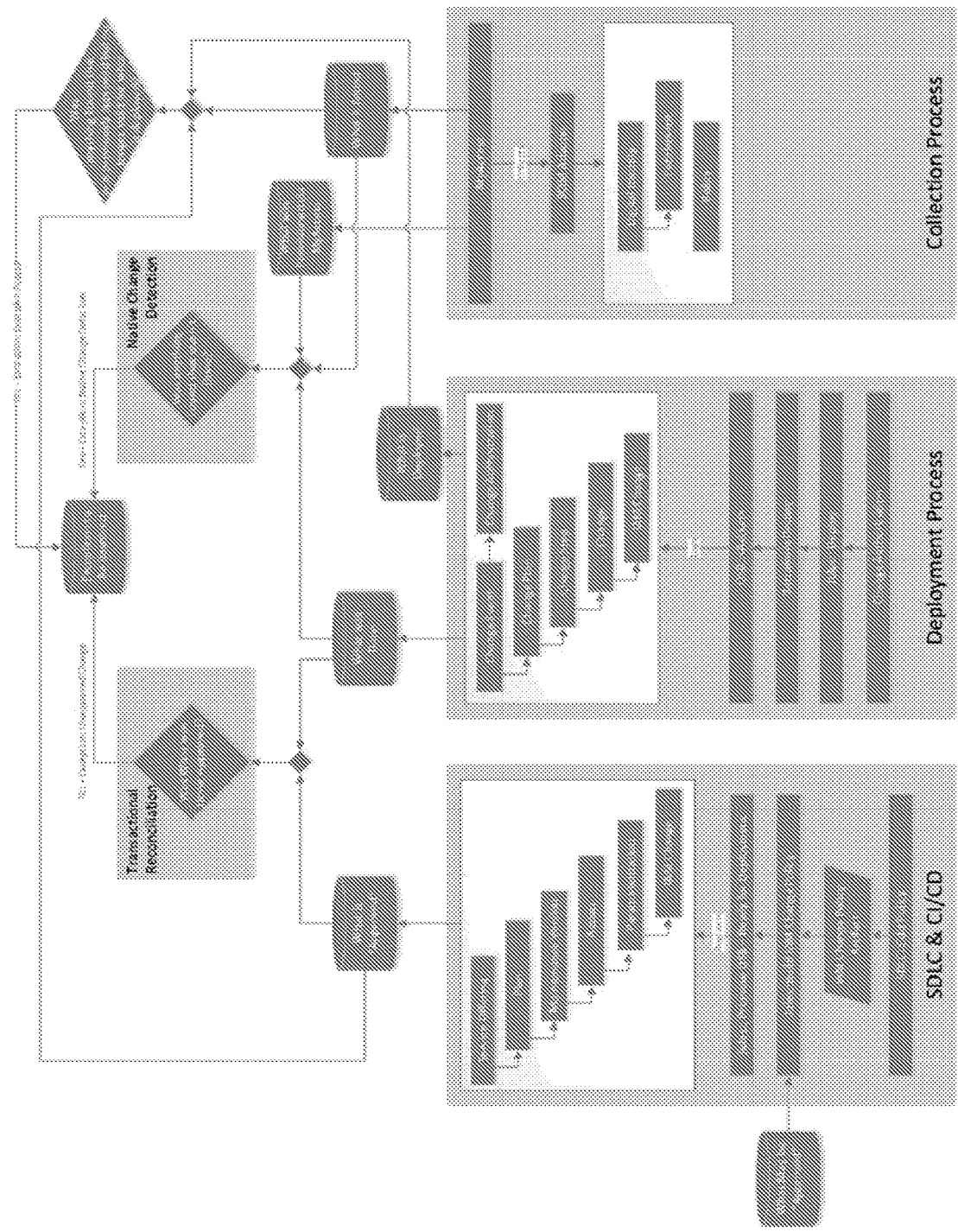
FIG. 11 is a diagram that illustrates an identity and access management (IAM) control model that is usable for implementing a method for facilitating identity and access management in a cloud environment based on a zero-trust configuration, according to an exemplary embodiment.

FIG. 11 is a diagram 1100 that illustrates an identity and access management (IAM) control model that is usable for implementing a method for facilitating identity and access management in a cloud environment based on a zero-trust configuration, according to an exemplary embodiment. Diagram 1100 provides for a minimum IAM role model and the interaction of the key processes involved.

As illustrated in FIG. 11, the control model will be able to capture from IAM the master IAM change policy for infrastructure as code that defines the acceptable limits of IAM change policy that can be published through the SDLC process for any resource. This policy will enforce limits on ownership of accounts, entitlements, and policies that may be impacted by the resource specific IAM change policy. The control model will also be able to capture from the SDLC process an IAM change policy for each deployable configuration of a resource (in this case represented in terms of the OSB model). This policy will describe the IAM changes required and (through requirements, test cases, test results, and acceptance) approved as part of the specific deployment action.

Similarly, the control model will be able to capture from the deployment process logs of all IAM changes made, the resource change action that required that change, and the change event, change authorization, and change plan that triggered the resource change action. This logging will be in a standard format to a designated lossless queue. Further, the control model will be able to capture, via the collection process, the account, entitlements, and/or policies actually deployed at runtime and their change history. Similarly, the control model will be able to perform transactional reconciliation by comparing the IAM changes logged to those documented as approved in the IAM changed policy for the resource requiring the change as well as support coexistence with IAM change by merging IAM changes logged through this process and IAM changes recorded as approved prior to nightly closure and native change detection.

Moreover, the control model will be able to perform native change detection by comparing the IAM changes logged to the actual state of accounts, entitlements, and policies collected. The control model will also be able to perform nightly closure by comparing actual state of accounts, entitlements, and policies collected with approved state for what is actually deployed as well as detect previously authorized access that is no longer approved for the current version/configuration of the any deployed resource.

In another exemplary embodiment, the control model may include requirements such as, for example, control requirements for general OSB, control requirements for policy store, control requirements for IAM OSB, control requirements for IAM API, control requirements for an asynchronous IAM completer, and control requirements for an identity and/or entitlement store.

The control requirements for general OSB may require that general OSB must comply with JPMC authentication and authorization controls. Authorization to call a general OSB must be managed either through this same process or through the administrative access process provided by a service such as, for example, MyAccess. In order for a general OSB to execute IAM relevant change the change must be delegated to an IAM OSB. General OSB must not call IAM API or execute IAM relevant change through any other means directly. This is required to ensure consistency of implementation and execution of controls.

A general OSB must pass as part of the request to the IAM OSB evidence of pre-authorization of the requested change. This evidence will include the change event, the authorization for the event and the change plan all of which may be passed by reference and some of all of which may be pre-validated by claims in the access token. A general OSB must comply fully comply with the requirements for environmental discipline. A general OSB must have requirements, test cases, test results, and acceptances for any IAM relevant change that will or may be initiated for each service offering, plan, or maintenance. Where parameterization of the plan impacts the IAM relevant change this variability must also be covered. This evidence must be managed in compliance with firm SDLC controls. A general OSB must not implement parameterization in a manner to allow a provisioning request or bind to request arbitrary access.

A general OSB may implement as policy as code an IAM change policy governing among other things the criteria for determining whether a request is authorized to request the provisioning of a service instance. Such policy will be created as a dedicated artifact in the SDLC process and subject to the same controls as any other artifact passing through that process. At time of deployment the policy must be distributed to the run time policy store supporting the general OSB and an IAM change notification record logged when the policy is IAM control relevant. A general OSB may take as a provisioning parameter a set of policy assertions that will be process as updates to the default IAM change policy set by the OSB. These updates must impact nothing, but the specific service instance created. Such policy assertions will be created as a dedicated artifact of a specified standard format in the SDLC process and subject to the same controls as any other artifact passing through that process. These policies must be processed through the IAM change policy OSB as updates to the deployed IAM change policy OSB for the instance. The IAM change policy OSB must log an IAM change notification record for the change when it is accepted.

An exception to the policy created at the time of the creation of a service instance may be created via the standard administrative IAM procedures with appropriate approvals. These policies will be deployed to the appropriate policy store via the IAM provisioning mechanisms. The IAM state for a service instance must be fully re-creatable from only by the managing OSB from only JRN attributes. A deployed resource instance change event must be logged to the deployed instance change event queue for all JRN impacting changes to a service instance.

The control requirements for policy store may require that a policy store utilized for IAM change policy must be managed only by the IAM change policy OSB, that a policy store must be able to clearly establish the set of objects for which its policies apply, that a policy store must maintain a full change history for reconciliation and audit purposes, and that a policy store must implement a system for cross-domain identity management (SCIM) interface and bind with the firm reconciliation service.

The control requirements for IAM OSB may require that an IAM OSB must meet all requirements of a general OSB unless contradicted and that an IAM OSB must execute IAM specific change by calling the approved IAM API for that type of change. The usage of IAM API is required because they allow IAM to enforce centrally administered preventative controls rather than rely on detective control and correct after change occurs. An IAM OSB must also pass, as part of the request to the IAM API, the evidence of pre-authorization of the requested change received from the general OSB unchanged. An IAM OSB that utilizes any IAM API whose contract stipulates it does not validate evidence of pre-authorization must perform this validation prior to calling, must log the results of the validation in the approved standard format and to the approved standard mechanism, and must not call the IAM API unless the validation passes. An IAM OSB must log all requests received, all requests to IAM API made, and the results of those calls in the approved standard format to the approved standard mechanism.

The control requirements for IAM API may require that all IAM API that execute IAM relevant change must accept as part of their input evidence of pre-authorization of the change being requested. Similarly, all IAM API must route transactional change to digital identities and/or entitlements through the approved strategic access management transaction engine when the transaction engine supports the required type of change and the API available meets all function and non-functional requirements. When these changes are executed by the transaction engine the IAM API may rely on that engine to meet the elements of these requirements promised in its own API client contract but remains obligated to meet any that are not. An IAM API that cannot route an IAM relevant change through the approved strategic access management transaction engine must be evaluated for risk from the lack of the ability to enforce central preventative controls and implement compensating controls or receive appropriate risk acceptance for any residual risk identified.

All IAM API that execute IAM relevant change should validate the change request is covered by the evidence of pre-authorization submitted with the requested change. When an IAM API does not validate the change requested, it must require in its contract that all consumers of the API perform this validation and log the result in the approved standard format to the approved standard mechanism. All IAM API must not return success until the change has been completed and is in effect and ready to use. IAM APIs that are asynchronous must return "accepted" upon receipt of the request and an optional polling frequency for the status of the request. All IAM API must log all requests received and the result of those requests in the approved standard format to the approved standard mechanism. An IAM API that directly implements IAM relevant change must log an IAM change notification record in the approved standard format to the approved standard mechanism.

An IAM change notification record must include the requestor of the change, the originator of the change, the transaction id of the change, the resources impacted by the change, the change made, the evidence of pre-approval submitted, whether or not the evidence was validated before the change was made, the status of the change at the time the IAM API returns, the role of this IAM API in the execution, the identity of the IAM API to which the change was delegated when the role of this API was delegator, the identity of this IAM API, a date timestamp for the receipt of the request and a data timestamp for the return of the response. The status of the change in the IAM change notification record must be accepted, complete, or failed and match the status code returned to the caller. The role of the IAM API in execution must be completer, delegator, or acceptor.

An IAM API that delegates an IAM relevant change to another IAM API must log an IAM change notification with the role of the IAM API set to delegator. An IAM API that completes an IAM relevant change must log an IAM change notification with the role of the IAM API set to completer. An IAM API that returns a status of "accepted" that it is not transferring from a response it itself received must log an IAM change notification with the role of the IAM API set to acceptor. An IAM API that delegates to more than one IAM relevant change to the same or different IAM API must log an IAM change notification record for each change separately. An IAM API that both completes, accepts, and/or delegates more than one IAM relevant change must log an IAM change notification record for each change separately. An IAM API designed to accept a request on behalf of an asynchronous IAM completer must provide the identity of the IAM completer expected to resolve in the field of the IAM change notification record for the identity of the IAM API to which the change was delegated.

The control requirements for an asynchronous IAM completer may require that an asynchronous IAM completer must meet all requirements of an IAM API. The control requirements for an identity and/or entitlement store may require that the store should be on boarded to the strategic access management transaction engine for full automated provisioning through the standard system for cross-domain identity management (SCIM) or Rest API models, and that the store must be on boarded to the strategic access management transaction engine for at least collection through the standard SCIM or Rest API models.

Accordingly, with this technology, an optimized process for facilitating identity and access management in a cloud environment based on a zero-trust configuration is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating identity and access management in a cloud environment based on a zero-trust configuration, the method being implemented by at least one processor, the method comprising:

retrieving, by the at least one processor via a job, at least one token from a corresponding identity provider, the job including at least one from among a unit of work and a unit of execution that corresponds to at least one change, and the identify provider provides principal authentication to other service providers within a federation;

retrieving, by the at least one processor via the job and in response to the at least one token and a change authorization identifier, a change authorization from a change management system, the change authorization including the at least one token and a signed change authorization;

retrieving, by the at least one processor via the job and in response to the at least one token and a change plan artifact path, a change artifact from an artifact repository, the change artifact including a signed change artifact;

requesting, by the at least one processor via the job, a change orchestrator to execute the at least one change, the request including at least one from among the at least one token, the change authorization, and the change artifact;

instructing, by the at least one processor via the change orchestrator, a service broker to execute the at least one change;

obtaining, by the at least one processor via the service broker, a root change authorization token for the at least one change; and executing, by the at least one processor via the service broker and using the root change authorization token, the at least one change within the cloud environment, wherein the service broker is implemented by an open service broker, and wherein an authorized change initiator is required to directly request a first level of the open service broker to actuate the at least one change, and the authorized change initiator is required to submit a valid change authorization token with a request to the open service broker.

2. The method of claim 1, wherein the at least one token includes a federated identity assertion token that is exchangeable for a resource specific access token.

3. The method of claim 1, wherein the job further includes at least one from among a continuous integration job and a continuous deployment job that modify at least one from among the cloud environment and an application within the cloud environment.

4. The method of claim 1, wherein the retrieving of the at least one token further comprises:
  requesting, by the at least one processor via the job, the at least one token from the corresponding identity provider, the request for the at least one token including a bootstrap identity and a uniform resource identifier;
  verifying, by the at least one processor via the identity provider, the bootstrap identity;
  retrieving, by the at least one processor via the identity provider, at least one identity attribute from an identity provider directory service;
  requesting, by the at least one processor via the identity provider, an issuance authorization from an identity provider policy system, the request for the issuance authorization including the at least one identity attribute and the uniform resource identifier;
  receiving, by the at least one processor via the identity provider, a response from the identity provider policy system; and
  receiving, by the at least one processor via the job, the at least one token from the identity provider based on the response.

5. The method of claim 1, wherein the retrieving of the change authorization further comprises:
  requesting, by the at least one processor via the job, the change authorization from the change management system, the request for the change authorization including the at least one token and change authorization identifier;
  retrieving, by the at least one processor via the change management system, a key from a change management identity provider;
  validating, by the at least one processor via the change management system, the at least one token based on the key;
  authorizing, by the at least one processor via the change management system, the request for the change authorization based on a result of the validating;
  retrieving, by the at least one processor via the change management system, at least one change authorization attribute based on a result of the authorizing;
  signing, by the at least one processor via the change management system, payload content corresponding to the job; and
  receiving, by the at least one processor via the job, the change authorization from the change management system.

6. The method of claim 1, wherein the retrieving of the change artifact further comprises:
  requesting, by the at least one processor via the job, the change artifact from the artifact repository, the request for the change artifact including the at least one token and the change plan artifact path;
  retrieving, by the at least one processor via the artifact repository, a key from a change management identity provider;
  validating, by the at least one processor via the artifact repository, the at least one token based on the key;
  authorizing, by the at least one processor via the artifact repository, the request for a change plan based on a result of the validating; and
  receiving, by the at least one processor via the job, the change artifact from the artifact repository.

7. The method of claim 1, wherein the service broker generates a service instance for a consumer of a service based on at least one unique characteristic of the service instance, the at least one unique characteristic including a reference to a change plan and a parameter of the change plan.

8. The method of claim 1, wherein a control model is used to create end-to-end evidence of a change pre-approval, the control model including at least one from among a process control requirement, a change plan control requirement, a subscription control requirement, an environment control requirement, a change authorization requirement, a change plan requirement, and a change plan step requirement.

9. The method of claim 8, wherein the control model performs native change detection by comparing at least one logged change with a state of a corresponding account, a corresponding entitlement, and a corresponding collected policy.

10. A computing device configured to implement an execution of a method for facilitating identity and access management in a cloud environment based on a zero-trust configuration, the computing device comprising:
  a processor;
  a memory; and
  a communication interface coupled to each of the processor and the memory,
  wherein the processor is configured to:
    retrieve, via a job, at least one token from a corresponding identity provider, the job including at least one from among a unit of work and a unit of execution that corresponds to at least one change, and the identify provider provides principal authentication to other service providers within a federation;
    retrieve, via the job and in response to the at least one token and a change authorization identifier, a change authorization from a change management system, the change authorization including the at least one token and a signed change authorization;
    retrieve, via the job and in response to the at least one token and a change plan artifact path, a change artifact from an artifact repository, the change artifact including a signed change artifact;
    request, via the job, a change orchestrator to execute the at least one change, the request including at least one from among the at least one token, the change authorization, and the change artifact;
    instruct, via the change orchestrator, a service broker to execute the at least one change;
    obtain, via the service broker, a root change authorization token for the at least one change; and
    execute, via the service broker and using the root change authorization token, the at least one change within the cloud environment,
  wherein the service broker is implemented by an open service broker, and
  wherein an authorized change initiator is required to directly request a first level of the open service broker to actuate the at least one change, and the authorized change initiator is required to submit a valid change authorization token with a request to the open service broker.

11. The computing device of claim 10, wherein the at least one token includes a federated identity assertion token that is exchangeable for a resource specific access token.

12. The computing device of claim 10, wherein the job further includes at least one from among a continuous integration job and a continuous deployment job that modify at least one from among the cloud environment and an application within the cloud environment.

13. The computing device of claim 10, wherein, to retrieve the at least one token, the processor is further configured to:
- request, via the job, the at least one token from the corresponding identity provider, the request for the at least one token including a bootstrap identity and a uniform resource identifier;
- verify, via the identity provider, the bootstrap identity;
- retrieve, via the identity provider, at least one identity attribute from an identity provider directory service;
- request, via the identity provider, an issuance authorization from an identity provider policy system, the request for the issuance authorization including the at least one identity attribute and the uniform resource identifier;
- receive, via the identity provider, a response from the identity provider policy system; and
- receive, via the job, the at least one token from the identity provider based on the response.

14. The computing device of claim 10, wherein, to retrieve the change authorization, the processor is further configured to:
- request, via the job, the change authorization from the change management system, the request for the change authorization including the at least one token and the change authorization identifier;
- retrieve, via the change management system, a key from a change management identity provider;
- validate, via the change management system, the at least one token based on the key;
- authorize, via the change management system, the request for the change authorization based on a result of the validating;
- retrieve, via the change management system, at least one change authorization attribute based on a result of the authorizing;
- sign, via the change management system, payload content corresponding to the job; and
- receive, via the job, the change authorization from the change management system.

15. The computing device of claim 10, wherein, to retrieve the change artifact, the processor is further configured to:
- request, via the job, the change artifact from the artifact repository, the request for the change artifact including the at least one token and the change plan artifact path;
- retrieve, via the artifact repository, a key from a change management identity provider;
- validate, via the artifact repository, the at least one token based on the key;
- authorize, via the artifact repository, the request for a change plan based on a result of the validating; and
- receive, via the job, the change artifact from the artifact repository.

16. The computing device of claim 10, wherein the processor is further configured to generate, via the service broker, a service instance for a consumer of a service based on at least one unique characteristic of the service instance, the at least one unique characteristic including a reference to a change plan and a parameter of the change plan.

17. The computing device of claim 10, wherein the processor is further configured to use a control model to create end-to-end evidence of a change pre-approval, the control model including at least one from among a process control requirement, a change plan control requirement, a subscription control requirement, an environment control requirement, a change authorization requirement, a change plan requirement, and a change plan step requirement.

18. The computing device of claim 17, wherein the processor is further configured to perform, via the control model, native change detection by comparing at least one logged change with a state of a corresponding account, a corresponding entitlement, and a corresponding collected policy.

19. A non-transitory computer readable storage medium storing instructions for facilitating identity and access management in a cloud environment based on a zero-trust configuration, the storage medium comprising executable code which, when executed by a processor, causes the processor to:
- retrieve, via a job, at least one token from a corresponding identity provider, the job including at least one from among a unit of work and a unit of execution that corresponds to at least one change, and the identify provider provides principal authentication to other service providers within a federation;
- retrieve, via the job and in response to the at least one token and a change authorization identifier, a change authorization from a change management system, the change authorization including the at least one token and a signed change authorization;
- retrieve, via the job and in response to the at least one token and a change plan artifact path, a change artifact from an artifact repository, the change artifact including a signed change artifact;
- request, via the job, a change orchestrator to execute the at least one change, the request including at least one from among the at least one token, the change authorization, and the change artifact;
- instruct, via the change orchestrator, a service broker to execute the at least one change;
- obtain, via the service broker, a root change authorization token for the at least one change; and
- execute, via the service broker and using the root change authorization token, the at least one change within the cloud environment,
- wherein the service broker is implemented by an open service broker, and
- wherein an authorized change initiator is required to directly request a first level of the open service broker to actuate the at least one change, and the authorized change initiator is required to submit a valid change authorization token with a request to the open service broker.

20. The storage medium of claim 19, wherein the at least one token includes a federated identity assertion token that is exchangeable for a resource specific access token, and wherein the job further includes at least one from among a continuous integration job and a continuous deployment job that modify at least one from among the cloud environment and an application within the cloud environment.

* * * * *